(12) United States Patent
Nishimura et al.

(10) Patent No.: US 8,825,308 B2
(45) Date of Patent: Sep. 2, 2014

(54) OPENING/CLOSING CONTROL DEVICE FOR A GRILLE SHUTTER

(75) Inventors: Eijiro Nishimura, Wako (JP); Ryoji Ehara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 13/695,474

(22) PCT Filed: Apr. 26, 2011

(86) PCT No.: PCT/JP2011/060107
§ 371 (c)(1),
(2), (4) Date: Oct. 31, 2012

(87) PCT Pub. No.: WO2011/138910
PCT Pub. Date: Nov. 10, 2011

(65) Prior Publication Data
US 2013/0046445 A1 Feb. 21, 2013

(30) Foreign Application Priority Data

May 6, 2010 (JP) .................................. 2010-106279
May 6, 2010 (JP) .................................. 2010-106280

(51) Int. Cl.
*B60K 11/04* (2006.01)
*B60K 11/08* (2006.01)
*B60H 1/32* (2006.01)
*F01P 7/10* (2006.01)

(52) U.S. Cl.
CPC ........... *B60H 1/3208* (2013.01); *F01P 2025/48* (2013.01); *B60K 11/085* (2013.01); *B60H 2001/3238* (2013.01); *B60H 2001/3248* (2013.01); *B60H 2001/3266* (2013.01); *B60H 2001/3277* (2013.01); *F01P 7/10* (2013.01)
USPC ............................... 701/49; 180/68.1; 454/75

(58) Field of Classification Search
CPC ....... B60K 11/085; B60K 11/08; B60K 11/04
USPC ............................... 701/49; 180/68.1; 454/75
See application file for complete search history.

(56) References Cited

U.S. PATENT DOCUMENTS

2006/0102399 A1 * 5/2006 Guilfoyle et al. ............ 180/68.1

FOREIGN PATENT DOCUMENTS

| EP | 0487098 | 5/1992 |
| JP | 60-082427 | 5/1985 |
| JP | 60-110625 | 7/1985 |
| JP | 62-181909 | 8/1987 |
| JP | 10-181339 | 7/1998 |
| JP | 2003-035224 | 2/2003 |
| JP | 2010-083429 | 4/2010 |

* cited by examiner

*Primary Examiner* — Mary Cheung
*Assistant Examiner* — Brian P Sweeney
(74) *Attorney, Agent, or Firm* — Rankin, Hill & Clark LLP

(57) ABSTRACT

An opening/closing control device for a grille shutter is capable of appropriately opening and closing the grille shutter according to a vehicle outside environment and an operating state of an aircon while ensuring the operation of the aircon, and is capable of sufficiently improving vehicle operating efficiency. An aircon operating time ratio as a ratio of operation time of an aircon to overall time is calculated. When the calculated aircon operating time ratio is larger than the sum of a threshold value calculated according to an ambient air temperature and a hysteresis constant, the grille shutter is opened to promote cooling of refrigerant in the aircon and reduce motive power consumed by the aircon. Therefore, it is possible to appropriately open and close the grille shutter depending on the ambient air temperature and the operating ration of the aircon.

18 Claims, 16 Drawing Sheets

F I G. 10
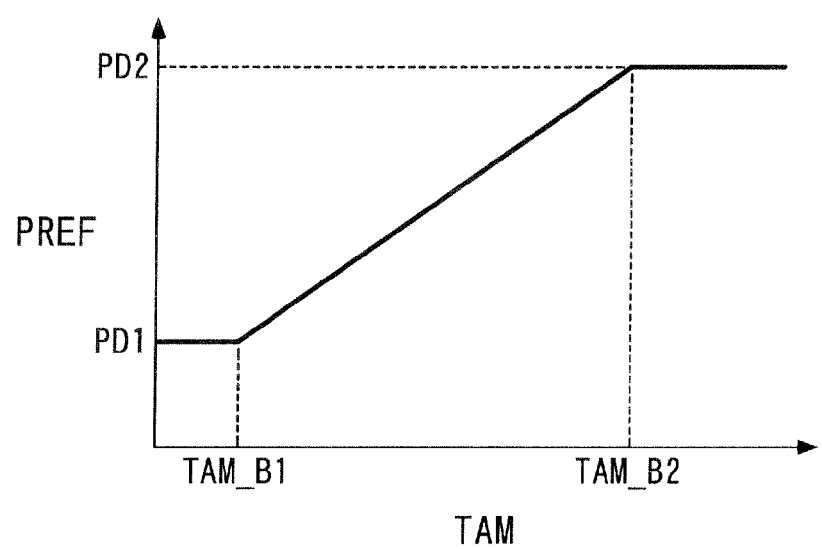

OPENING/CLOSING CONTROL DEVICE FOR A GRILLE SHUTTER

TECHNICAL FIELD

The present invention relates to an opening/closing control device for a grille shutter that is openably and closably provided at a front part of a vehicle, and when opened, introduces ambient air into the vehicle for cooling refrigerant of an aircon.

BACKGROUND ART

As a conventional opening/closing control device for a grille shutter, one described e.g. in PTL 1 is known. This grille shutter is for feeding ambient air for cooling, to a radiator disposed in an engine room of a vehicle. In this opening/closing control device, the temperature of water of the radiator is detected, and if the detected temperature of the water is higher than a predetermined temperature, the grille shutter is opened so as to cool the radiator, for the purpose of prevention of overheating of the engine. On the other hand, if the temperature of the water of the radiator is lower than the predetermined temperature, the grille shutter is closed, whereby an increase in air resistance due to opening of the grille shutter is avoided and fuel economy is improved.

Further, in the opening/closing control device, not only the temperature of the water of the radiator but also the operating state of an aircon (on/off of the aircon and position of a fan switch) and the temperature of the inside of the engine room are detected, and the opening/closing of the grille shutter is controlled according to detection results thereof.

CITATION LIST

Patent Literature

[PTL 1] Japanese Laid-Open Utility Model Registration Publication No. S60-110625.

SUMMARY OF INVENTION

Technical Problem

In the above-mentioned conventional opening/closing control device, however, the opening/closing of the grille shutter is controlled merely according to the temperature of the water of the radiator, the operating state of the aircon, and the temperature of the inside of the engine room. For this reason, depending on the external environment of the vehicle or the actual operating state of the aircon, fuel economy is rather degraded by closing of the grille shutter, whereby the improvement of fuel economy cannot sometimes be sufficiently achieved.

For example, even if the aircon is on and the fan switch is in the same position, in the case where the temperature of ambient air is high, as the load on the aircon becomes larger, motive power consumed by the aircon for driving a compressor increases, so that fuel economy is degraded. For this reason, even if the grille shutter is closed under such a situation, a degree of improvement in fuel economy by the closing of the grill shutter is sometimes exceeded by a degree of degradation in fuel economy due to motive power consumed by the aircon, and in this case, fuel economy of the whole vehicle is degraded.

The present invention has been made to provide a solution to such a problem, and an object thereof is to provide an opening/closing control device for a grille shutter, which is capable of appropriately opening and closing the grille shutter according to the vehicle outside environment and the operating state of an aircon while ensuring the operation of the aircon, and is thereby capable of sufficiently improving the operating efficiency of a vehicle.

Solution to Problem

To attain the object, the invention according to claim 1 of the present application is an opening/closing control device 1, 101 for a grille shutter, for controlling opening/closing of a grille shutter 47 that is openably and closably provided at a front part of a vehicle V, and when opened, introduces ambient air into the vehicle V for cooling refrigerant of an aircon 32, 132 of the vehicle V, comprising load acquisition means (ECU 2) for acquiring load on the aircon 32, 132 (aircon operating time ratio RA/CON and duty ratio DUTYCOMP of drive current in respective embodiments (hereafter, the same applies throughout this section)), ambient air temperature-detecting means (ambient air temperature sensor 22) for detecting a temperature of ambient air (ambient air temperature TAM), threshold value-setting means (ECU 2, step 23 in FIG. 7, step 82 both in FIGS. 8 and 15, FIG. 16) for setting a threshold value RREF, DREF according to the detected temperature of ambient air, and opening/closing control means (ECU 2, motor 31, steps 24, 31 in FIG. 7, steps 73, 77 in FIG. 12, steps 83, 89 in FIG. 15, steps 91, 77 in FIG. 17) for opening the grille shutter 47 when the acquired load is larger than the set threshold value RREF, DREF.

According to this opening/closing control device for a grille shutter, the load on the aircon is acquired and the threshold value is calculated according to the detected temperature of ambient air. Then, when the acquired load is larger than the threshold value, the grille shutter is opened.

The invention is based on the following viewpoint: As described hereinabove, in the case of the vehicle which includes an internal combustion engine as a motive power source, depending on a vehicle outside environment and an operating state of the aircon, even if the grille shutter is closed, a degree of improvement in fuel economy by the closing of the grill shutter is sometimes exceeded by a degree of degradation in fuel economy due to motive power consumed by the aircon, causing degradation of fuel economy.

From the above viewpoint, according to the present invention, when the load on the aircon is larger than the threshold value calculated according to the temperature of ambient air, the grille shutter is opened. The opening of the grille shutter promotes the cooling of the refrigerant and reduces the load on the aircon, whereby motive power consumed thereby can be reduced. Therefore, the grille shutter can be appropriately opened and closed depending on the vehicle outside environment and the operating state of the aircon, while ensuring the operation of the aircon, whereby the operating efficiency of the vehicle (fuel economy in the case where the internal combustion engine is used the motive power source) can be sufficiently improved.

The invention according to claim 2 is the opening/closing control device as claimed in claim 1, further comprising operation/stoppage state-detecting means (clutch switch 24) for detecting whether the aircon 32 is in an operating state or in a stopped state, and wherein the load acquisition means includes operating time ratio-calculating means (ECU 2, step 22 in FIG. 7) for calculating an operation time ratio (aircon operating time ratio RA/CON) of the aircon 32, based on the detected operating/stopped state of the aircon 32, as the load on the aircon.

With this configuration, the aircon operating time ratio is calculated as the load on the aircon, based on the detected operating/stopped state of the aircon. The motive power consumed by the aircon varies with the load on the aircon, and as the load is higher, the operating time of the aircon is longer and the operating time ratio becomes larger, which makes the motive power consumed by the aircon larger. For this reason, the aircon operating time ratio excellently represents the motive power consumed by the aircon. Therefore, it is possible to appropriately open and close the grille shutter according to the aircon operating time ratio and sufficiently improve the operating efficiency of the vehicle.

The invention according to claim 3 is the opening/closing control device as claimed in claim 2, wherein the opening/closing control means closes the grille shutter 47 when the stopped state of the aircon 32 has continued for not less than a predetermined time period TOFFREF (step 71, 72 in FIG. 12).

The state in which the aircon is at stop for not less than the predetermined time period is presumed to be a situation in which the load on the aircon is lower and a degree of demand for operation thereof is lower, or a situation in which an aircon switch is operated, for example, and the driver does not intend to use the aircon. According to the present invention, when the stopped state of the aircon continues for not less than the predetermined time period, the grille shutter is closed, and hence it is possible to further improve the operating efficiency of the vehicle through the reduction of air resistance by the closing of the grille shutter.

The invention according to claim 4 is the opening/closing control device as claimed in claim 1, wherein a compressor 113 that compresses the refrigerant of the aircon 132 is formed by a variable capacity compressor that can vary a capacity thereof, and wherein the load acquisition means includes operating capacity parameter acquisition means (ECU 2) for acquiring an operating capacity parameter (duty ratio DUTYCOMP of drive current) which indicates an operating capacity of the compressor 113, as the load on the aircon 132.

With this configuration, the operating capacity parameter which represents the actual operating capacity of the compressor of a variable capacity type for the aircon is acquired as the load on the aircon. The motive power consumed by the aircon varies with the load on the aircon, and when the compressor is of a variable capacity type, the operating capacity of the compressor is controlled such that as the load on the aircon is higher, the operating capacity of the compressor becomes larger. For this reason, the operating capacity of the compressor excellently represents the motive power consumed by the aircon. Therefore, it is possible to appropriately open and close the grille shutter according to the operating capacity parameter, and sufficiently improve the operating efficiency of the vehicle.

The invention according to claim 5 is the opening/closing control device 101 as claimed in claim 4, further comprising operation/stoppage state-detecting means (clutch switch 24) for detecting whether the aircon 132 is in an operating state or in a stopped state, and wherein the opening/closing control means closes the grille shutter 47 when the detected stopped state of the aircon 132 has continued for not less than the predetermined time period TOFFREF (steps 71, 72 in FIG. 17).

According to the present invention, similarly to the invention as claimed in claim 3, when the stopped state of the aircon has continued for not less than the predetermined time period, the grille shutter is closed, and hence it is possible to further improve the operating efficiency of the vehicle through the reduction of the air resistance by the closing.

The invention according to claim 6 is the opening/closing control device 1, 101 as claimed in any one of claims 2 to 5, further comprising cooling pressure-detecting means (refrigerant pressure sensor 21) for detecting a pressure (refrigerant pressure PD) of the refrigerant of the aircon 32, 132, and determination-purpose refrigerant pressure-setting means (ECU 2, steps 47 to 49 in FIG. 9) for setting the pressure (aircon stoppage-time pressure PDOFF) of the refrigerant, detected by the cooling pressure-detecting means, as refrigerant pressure for determination (determination-purpose refrigerant pressure PD_JUD), when the aircon 32, 132 has been changed from the operating state to the stopped state, and wherein the opening/closing control means opens the grille shutter when the set refrigerant pressure for determination is larger than a predetermined pressure threshold value PREF (steps 53, 54 in FIG. 9, steps 74, 77 in FIG. 12, steps 74, 77 in FIG. 17).

With this configuration, when the refrigerant pressure of the aircon is larger than the predetermined pressure threshold value, the grille shutter is opened. The opening of the grille shutter promotes the cooling of the refrigerant and reduces the load on the aircon, whereby it is possible to avoid the pressure of the refrigerant from becoming even larger to become too large. Therefore, it is possible to effectively protect the aircon. Further, since a fixed pressure detected when the aircon has been changed from the operating state to the stopped state is used as the refrigerant pressure for determination with which the pressure threshold value is compared, it is possible to appropriately perform the opening/closing control of the grille shutter without hunting.

The invention according to claim 7 is the opening/closing control device as claimed in claim 6, wherein the determination-purpose refrigerant pressure-setting means set the refrigerant pressure, detected by the cooling pressure-detecting means, as the refrigerant pressure for determination, when the operating state of the aircon 32, 132 has continued for not less than a predetermined time period TONREF2 (steps 50, 51 in FIG. 9).

With this configuration, when the operating state of the aircon has continued for not less than the predetermined time period, the detected refrigerant pressure is used as the refrigerant pressure for determination. Therefore, it is possible to appropriately control the opening/closing of the grille shutter in a fine-grained manner according to the actual refrigerant pressure which fluctuates during operation of the aircon, and even more effectively protect the aircon.

The invention according to claim 8 is the opening/closing control device as claimed in any one of claims 1 to 7, wherein the opening/closing control means closes the grille shutter 47 when the detected temperature of ambient air is lower than a predetermined temperature TREF (steps 61, 62 in FIG. 11, steps 75, 72 in FIG. 12, steps 75, 72 in FIG. 17).

With this configuration, when the detected temperature of ambient air is lower than the predetermined temperature, the grille shutter is closed. This causes the grille shutter to be closed, when the ambient air temperature is low as in winter season, during which the aircon is not used or the necessity for using the same is low, whereby it is possible to improve fuel economy and promote warming up of an internal combustion engine in the case where the engine is used as a motive power source.

The invention according to claim 9 is the opening/closing control device 1, 101 as claimed in any one of claims 1 to 8, further comprising vehicle speed-detecting means (vehicle speed sensor 23) for detecting a speed (vehicle speed VP) of the vehicle V, and wherein the opening/closing control means opens the grille shutter 47 when the detected speed of the vehicle is lower than a predetermined speed (difference between a predetermined speed VREF and a hysteresis constant ΔV) (steps 64, 65 in FIG. 11, steps 75, 77 in FIG. 12, steps 75, 77 in FIG. 17).

When the vehicle is at stop or traveling at slow speed, the air resistance reduction effect by closing of the grille shutter is small and a refrigerant cooling effect by traveling wind is small, and hence the load on the aircon is likely to become larger. With the above configuration, when the detected vehicle speed is lower than the predetermined speed, the grille shutter is opened. The cooling of the refrigerant by the opening of the grille shutter appropriately reduces the load on the aircon which is likely to become larger when the vehicle is at stop or in similar states.

The invention according to claim 10 is the opening/closing control device 1, 101 as claimed in any one of claims 1 to 9, further comprising switching inhibiting means (ECU 2, steps 78, 72 in FIG. 12, steps 78, 72 in FIG. 17) for inhibiting, when switching the grille shutter 47 from an open state to a closed state by the opening/closing control means, the switching for a predetermined time period TSREF.

With this configuration, it is possible to appropriately prevent hunting when the grille shutter is switched from the open state to the closed state.

BRIEF DESCRIPTION OF DRAWINGS

FIG. 10 A map for calculating a threshold value of a determination-purpose refrigerant pressure.

MODE FOR CARRYING OUT INVENTION

Figure 1:
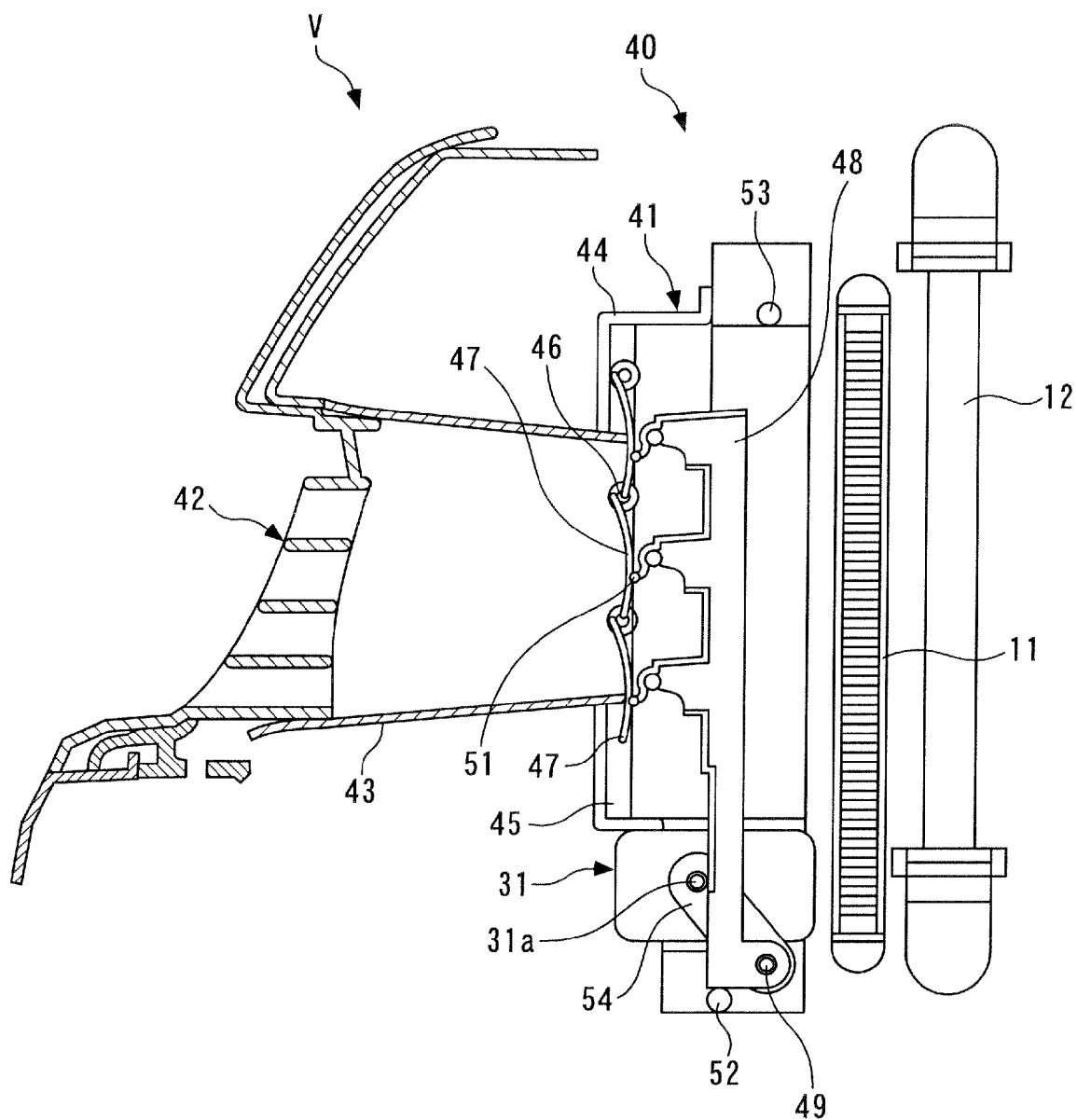
FIG. 1 A cross-sectional view of a ventilation device of a vehicle in a state in which a grille shutter is closed.

Hereafter, preferred embodiments of the present invention will be described with reference to drawings. As shown in FIG. 1, a vehicle V that mounts an opening/closing control device 1 to which is applied the present invention includes a ventilation device 40 at a front part thereof. The ventilation device 40 includes a grille 42, a duct 43, and a grille shutter mechanism 41, in the mentioned order from the front side of the vehicle V (from the left side of the figure), and rearward of these, there are provided a condenser 11 and a radiator 12 of an aircon 32, described hereinafter.

The grille shutter mechanism 41 includes a shutter base 44, a support member 45 which vertically extends within the shutter base 44, a plurality of horizontal shafts 46 which are supported by the support member 45, and a grille shutter 47 which is pivotally mounted on each shaft 46. Each grille shutter 47 is pivotally connected, via a joint 51, to a slide link 48 which vertically extends, and the slide link 48 is connected, via a joint pin 49 and an arm link 54, to a rotating shaft 31a of a motor 31. Further, in a state in which the grille shutter 47 is closed as shown in FIG. 1, a lower end of the slide link 48 is in abutment with a stopper 52.

Figure 2:
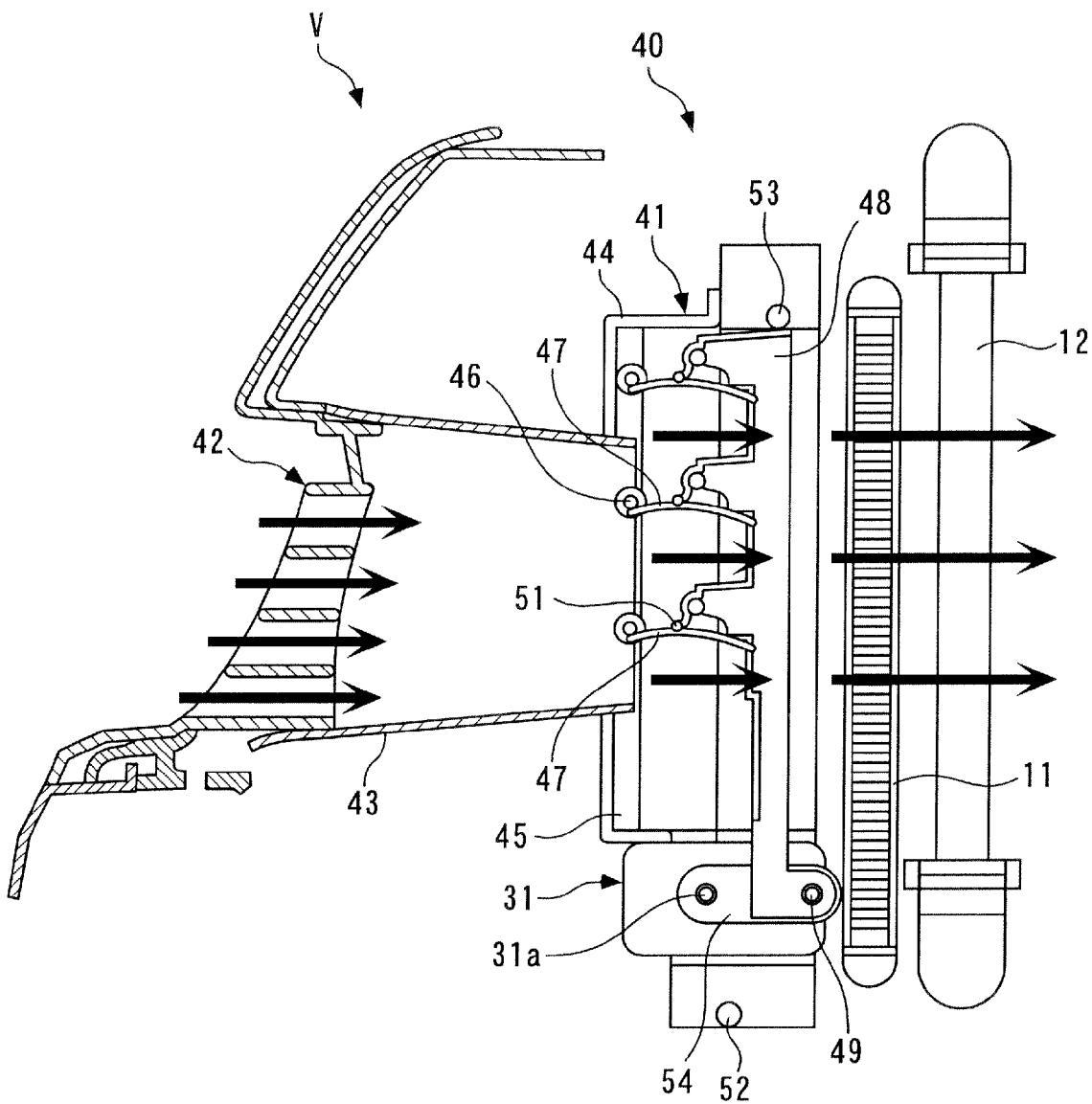
FIG. 2 A cross-sectional view of the ventilation device of the vehicle in a state in which the grille shutter is opened.

The motor 31 is formed by a DC motor whose rotating shaft 31a rotates within a predetermined angle range. When the rotating shaft 31a rotates counterclockwise from the state shown in FIG. 1, along with the pivotal movement of the arm link 54 performed in unison therewith, the slide link 48 is moved upward until it is brought into abutment with an upper stopper 53 located above. Along with the movement of the slide link 48, each grille shutter 47 is rotated counterclockwise about the shaft 46, and is switched into the open state shown in FIG. 2.

In the open state of the grille shutter 47, ambient air flowing into the vehicle V through the grille 42 during traveling thereof is guided by the duct 43 to pass through the condenser 11 and the radiator 12, and is then vented out to the atmosphere. While the ambient air thus passes through the condenser 11 and the radiator 12, heat is removed from refrigerant flowing in the condenser 11 and cooling water flowing in the radiator 12, whereby the refrigerant and the cooling water are cooled.

Figure 3:
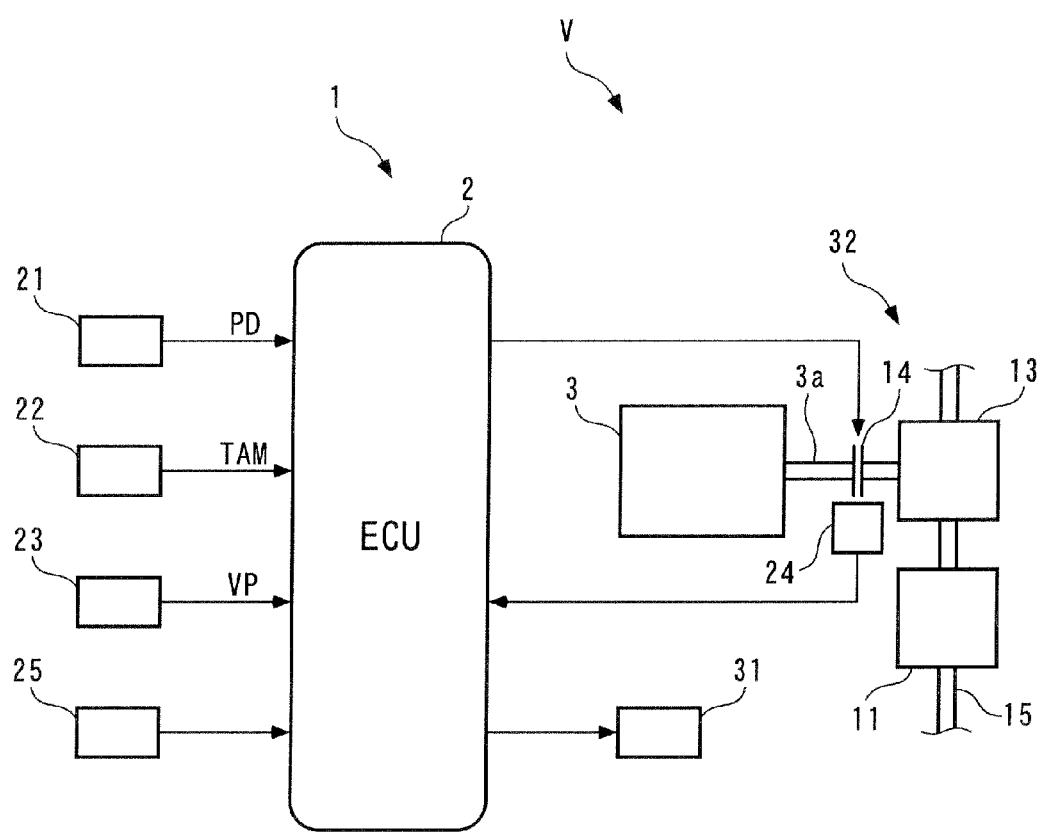
FIG. 3 A block diagram showing an opening/closing control device for a grille shutter according to a first embodiment of the present invention.

As shown in FIG. 3, the vehicle V mounts the air conditioner (hereinafter referred to as "aircon" 32 for cooling the inside of a driver's cabin (not shown). The above-mentioned condenser 11 constitutes a refrigeration cycle of the aircon 32, together with a compressor 13, an evaporator (not shown), etc.

The compressor 13 is of a fixed capacity type, and is connected to a crankshaft 3a of an engine 3, via an electromagnetic aircon clutch 14 etc. When the aircon clutch 14 is in an engaged state, the compressor 13 is driven by motive power of the engine 3, and compresses the refrigerant in the form of a low-temperature low-pressure gas into the refrigerant in the form of a high-temperature high-pressure gas, which is then sent to the condenser 11 via a refrigerant pipe 15. The load on the engine 3 caused by the compressor 13 becomes larger as the load on the aircon 32 becomes larger.

The engagement/disengagement of the aircon clutch 14 is set according to the operating state of an aircon switch (not shown) which is provided in the driver's cabin, and is controlled by an ECU 2. Specifically, when the aircon switch is set to an off state by the operation of the driver, the aircon clutch 14 is disengaged, whereby the aircon 32 is held in a stopped state. When the aircon switch is in an on state, the ECU 2 causes the aircon clutch 14 to be engaged or disengaged such that the temperature in the driver's cabin (hereafter referred to as the "cabin temperature") becomes equal to a preset temperature set by the driver, thereby controlling the operation/stoppage of the aircon 32. Further, a state of engagement/disengagement of the aircon clutch 14 is detected by a clutch switch 24, and a detection signal indicative thereof is output to the ECU 2.

Further, a refrigerant pressure sensor 21 is provided in the refrigerant pipe 15 at a location immediately downstream of the compressor 13. The refrigerant pressure sensor 21 detects a pressure of the refrigerant flowing in the refrigerant pipe 15 (hereafter referred to as "refrigerant pressure") PD, and delivers a detection signal indicative of the detected pressure to the ECU 2.

Further, a detection signal indicative of the temperature of the ambient air (hereafter referred to as "ambient air temperature") TAM from an ambient air temperature sensor 22 and a detection signal indicative of a vehicle speed VP which is the traveling speed of the vehicle V from a vehicle speed sensor 23 are delivered to the ECU 2. Further, a detection signal indicative of an on/off state of an ignition switch 25 is delivered to the ECU 2.

The ECU 2 is implemented by a microcomputer (not shown) comprising a CPU, a RAM, a ROM, and an I/O interface (none of which are shown). The ECU 2 executes various processing operations based on control programs stored in the ROM etc., according to detection signals from the above-mentioned sensors 21 to 23 and switches 24, 25.

In the present embodiment, the ECU 2 corresponds load acquisition means, operating time ratio-calculating means, operating capacity parameter acquisition means, threshold value-setting means, opening/closing control means, determination-purpose refrigerant pressure-setting means, and switching inhibiting means.

Next, an opening/closing control process for the grille shutter 47 according to a first embodiment of the present invention will be described with reference to FIGS. 4 to 12. The opening/closing control process controls the opening/closing of the grille shutter 47, according to the operating state of the aircon 32 and the traveling state of the vehicle V, and FIG. 4 corresponds to a main routine, while FIGS. 5, 7, 9, 11 and 12 corresponds to subroutines. Each process is executed at intervals of a predetermined time period.

Figure 4:
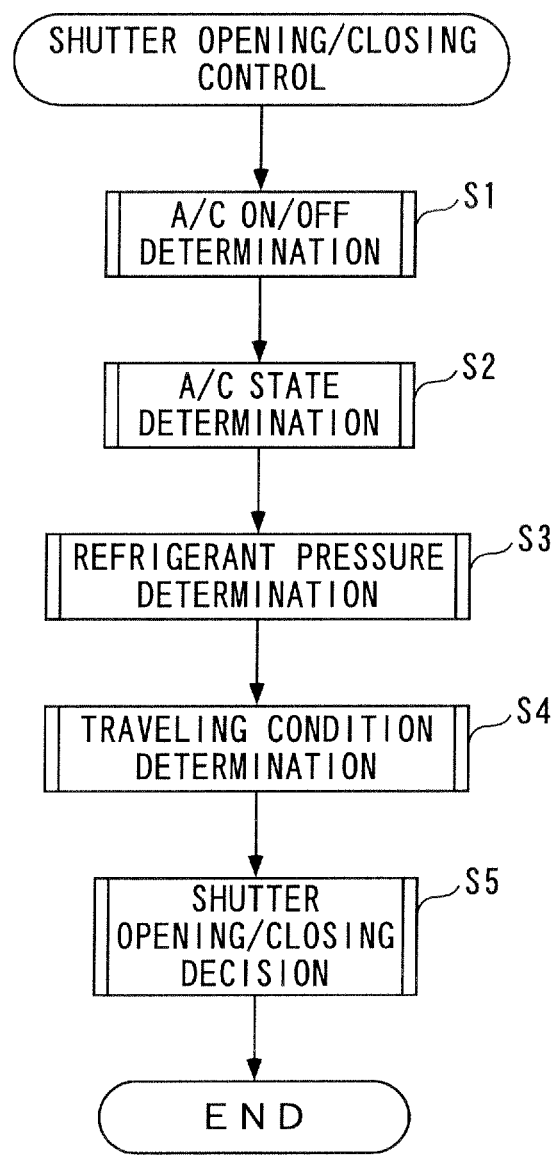
FIG. 4 A flowchart showing an opening/closing control process for the grille shutter according to the first embodiment.
Figure 5:
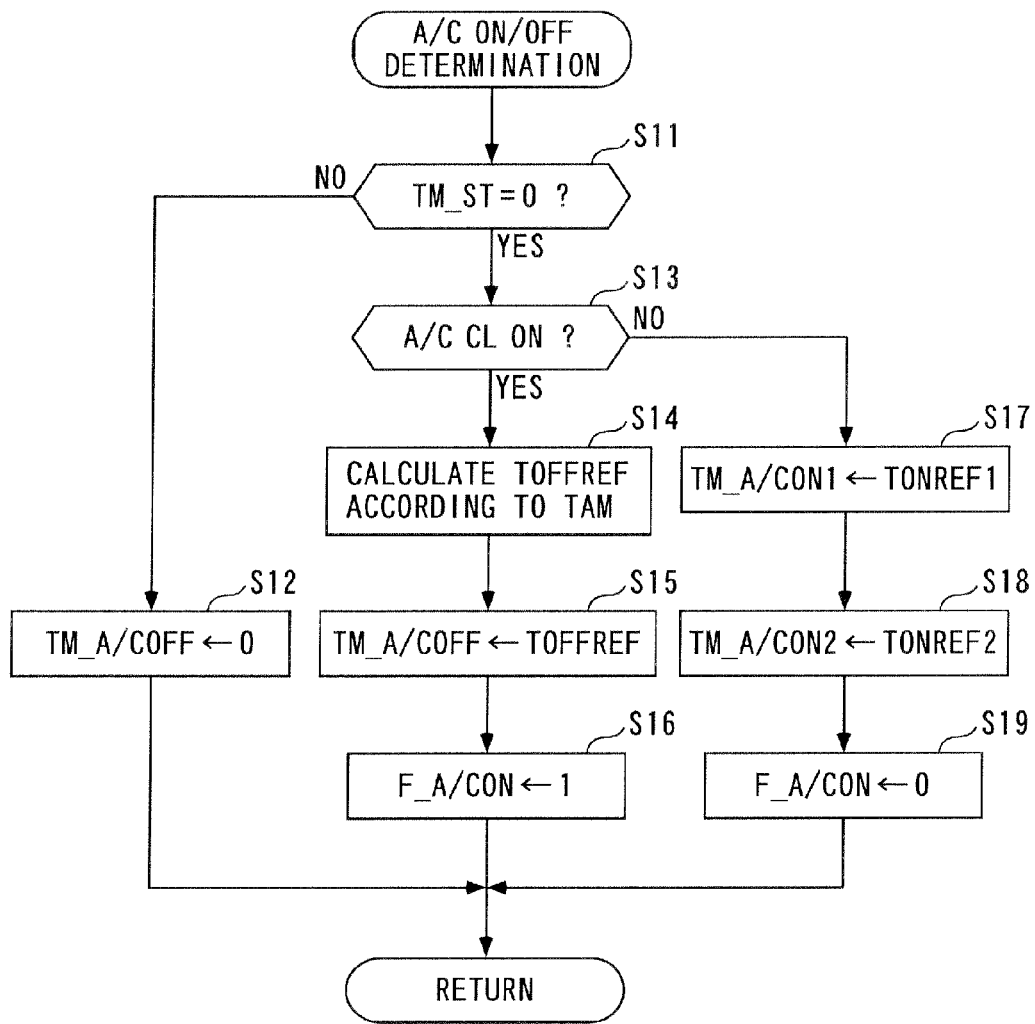
FIG. 5 A flowchart showing an operation/stoppage determination process for an aircon.

In the main routine of FIG. 4, first, in a step 1 (denoted as "S1" in FIG. 4; steps mentioned hereafter are also denoted in the same manner), an aircon operation/stoppage (AC ON/OFF) determination process is executed. The aircon operation/stoppage determination process determines whether the aircon 32 is in an operating state or in a stopped state, and according to a result of the determination, sets values of various timer values and the like, which are used for the opening/closing control, and FIG. 5 shows a subroutine therefor.

In the present process, first, it is determined in a step 11 whether or not a value of an after-start timer (hereafter referred to as "after-start timer value") TM_ST which measures time elapsed after the engine 3 is started is 0. The after-start timer value TM_ST is reset to a predetermined time period TMREF (for example, 3 sec) when the ignition switch 25 is turned on.

Note that, all timers used in the present embodiment including the after-start timer are of a down-count type. The timer value of each timer is reset to an associated predetermined value when a predetermined reset condition therefor is satisfied, and except this time, it is counted down until it becomes equal to 0, whereupon the down-counting is stopped to thereby hold the timer value at 0.

If the answer to the question of the step 11 is NO, which means that the predetermined time period TMREF has not elapsed after starting the engine 3, a value of an aircon stoppage timer (hereafter referred to as "aircon stoppage timer value") which measures duration of a state in which the aircon 32 is in the stopped state is held at 0 in a step 12, followed by terminating the present process.

On the other hand, if the answer to the question of the step 11 is YES, which means that time not shorter than the predetermined time period TMREF has elapsed after starting the engine 3, it is determined in a step 13, based on the detection signal from the clutch switch 24, whether or not the aircon clutch (A/C CL) 14 is engaged. If the answer to this question is YES, it is judged that the aircon 32 is in the operating state, and steps 14 et seq. are executed.

Figure 6:
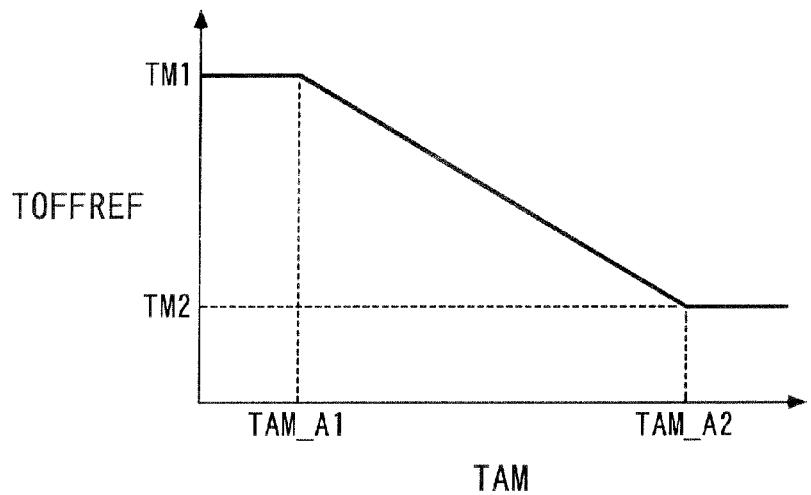
FIG. 6 A map for calculating a predetermined time period for use in determining a stoppage duration state of the aircon.

First, in the step 14, a predetermined time period TOFFREF is calculated by searching a map shown in FIG. 6 according to the ambient air temperature TAM. In this map, the predetermined time period TOFFREF is set to a first predetermined value TM1 when the ambient air temperature TAM is lower than a value TAM_A1, and is set to a lower value as the ambient air temperature becomes higher when the ambient air temperature TAM is higher than the value TAM_A1 and is lower than a value TAM_A2. Further, when the ambient air temperature TAM is higher not lower than the value TAM_A2, the predetermined time period TOFFREF is set to a second predetermined value TM2 which is smaller than the first predetermined value TM1.

Next, in a step 15, the aircon stoppage timer value TM_A/COFF is reset to the calculated predetermined time period TOFFREF, and in a step 16, an aircon operating flag F_A/CON is set to "1" to indicate that the aircon 32 is in the operating state, followed by terminating the present process.

On the other hand, if the answer to the question of the above-mentioned step 13 is NO, which means that the aircon clutch 14 is disengaged, it is determined that the aircon 32 is in the stopped state, and then steps 17 et seq. are executed. First, in the step 17 and a step 18, a value of a first aircon operating timer (hereafter referred to as "first aircon operating timer value") TM_A/CON1 and a value of a second aircon operating timer (hereafter referred to as "second aircon operating timer value") TM_A/CON2, both of which measure duration of the operating state of the aircon 32, are reset to a predetermined time period TONREF1 and a predetermined time period TONREF2, respectively. Next, in a step 19, the aircon operating flag F_A/CON is set to "0" to indicate that the aircon 32 is in the stopped state, followed by terminating the present process.

Figure 7:
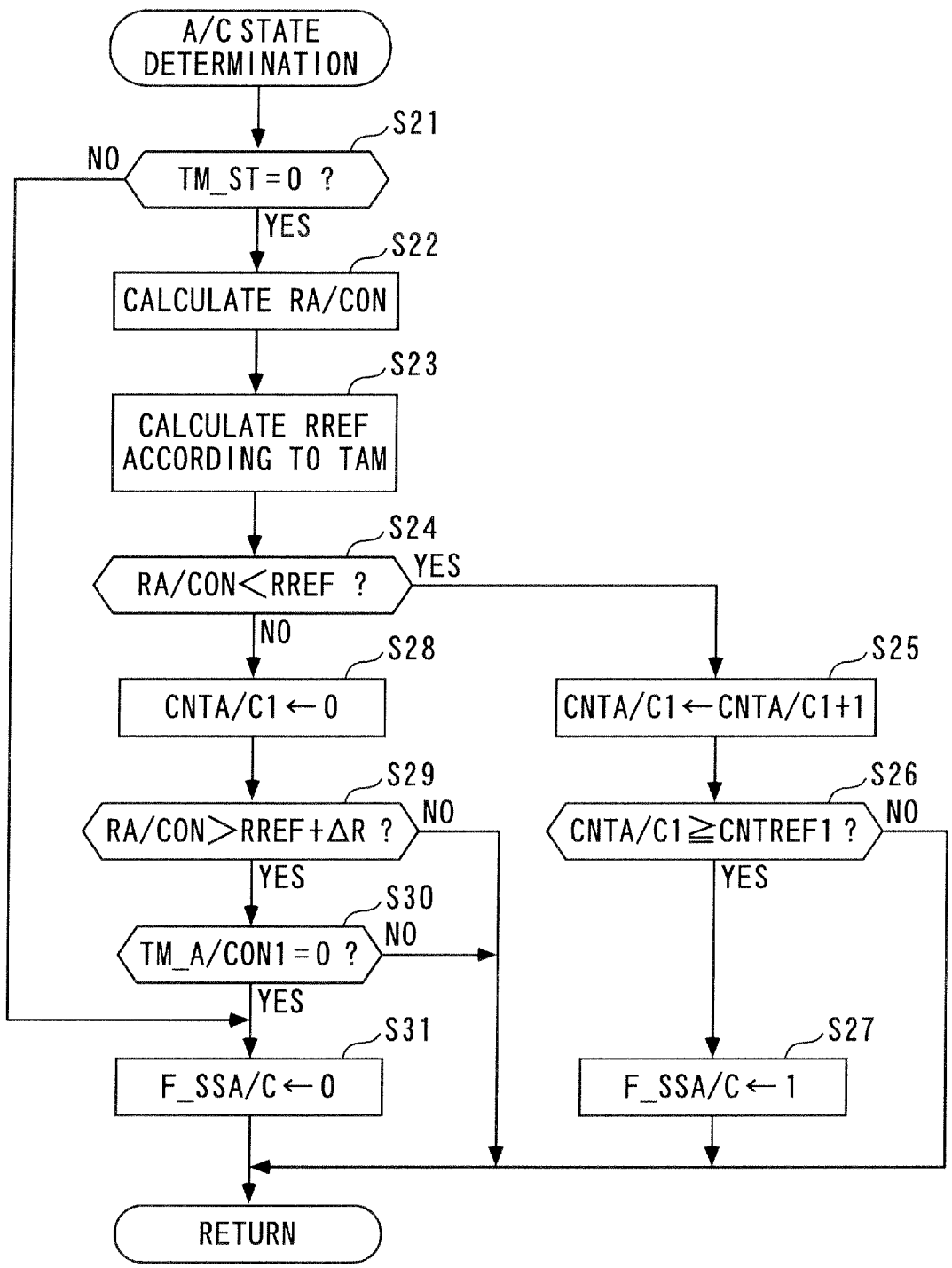
FIG. 7 A flowchart showing an aircon state determination process.

Referring again to FIG. 4, in a step 2 following the step 1, an aircon state determination process is executed. The aircon determination process determines, based the operating state of the aircon 32, whether the grille shutter 47 is to be opened or closed from the viewpoint of improvement of fuel economy, and FIG. 7 shows a subroutine therefor.

In the present process, first, it is determined in a step 21 whether or not the above-mentioned after-start timer value TM_ST is 0. If the answer to this question is NO, which means that the predetermined time period TMREF has not elapsed after starting the engine 3, it is determined that the grille shutter 47 is to be opened, and to indicate this, an aircon state flag F_SSA/C is set to "0" in a step 31, followed by terminating the present process.

On the other hand, if the answer to the question of the step 21 is YES, which means that time not shorter than the predetermined time period TMREF has elapsed after starting the engine 3, an aircon operating time ratio RA/CON is calculated in a step 22. The aircon operating time ratio RA/CON indicates an operating ratio of the aircon 32 for a predetermined time period up to the present time, and is calculated by the following equation (1):

$$RA/CON=(T\_A/CON)/(T\_A/CON+T\_A/COFF) \quad (1)$$

wherein T_A/CON represents an aircon operating time which is calculated by integrating time over which the aircon clutch 14 has been engaged within the above-mentioned predetermined time period, and further, T_A/COFF represents an aircon stoppage time which is calculated by integrating time over which the aircon clutch 14 has been disengaged within the above-mentioned predetermined time period.

Figure 8:
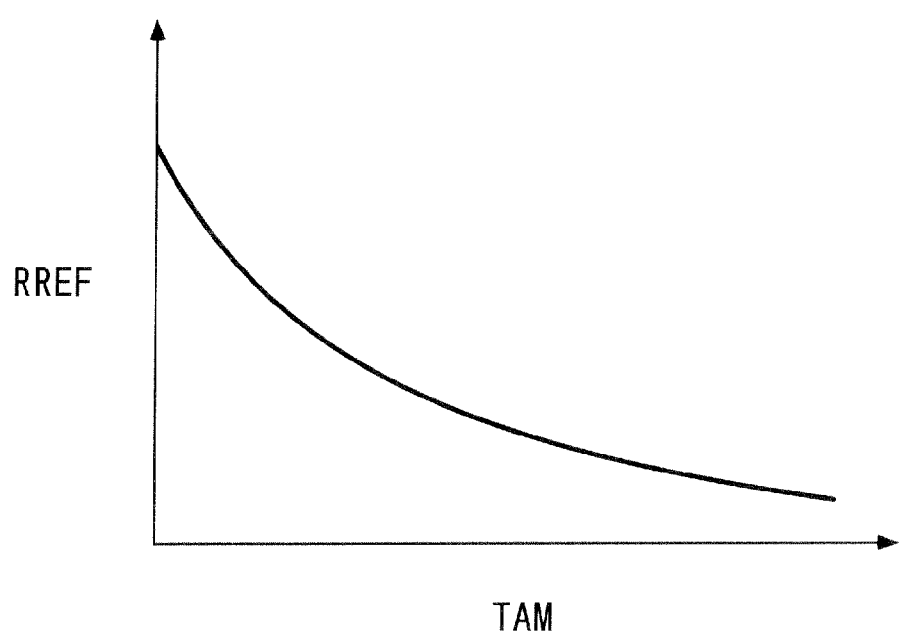
[FIG. 8] A map for calculating a threshold value of an aircon operating time ratio.

Next, in a step 23, a threshold value RREF is calculated by searching a map shown in FIG. 8 according to the ambient air temperature TAM. In this map, the threshold value RREF is set to a smaller value as the ambient air temperature TAM is higher.

Next, it is determined in a step 24 whether or not the calculated aircon operating time ratio RA/CON is smaller than the threshold value RREF. If the answer to this question is YES, a first counter value CNTA/C1 which counts the number of times of duration of this state is incremented in a step 25, and it is determined in a step 26 whether or not the first counter value CNTA/C1 is not smaller than a predetermined count CNTREF1 (e.g. 4). If the answer to this question is NO, the present process is immediately terminated.

On the other hand, if the answer to the question of the step 26 is YES, in other words, if the state in which the aircon operating time ratio RA/CON is below the threshold value RREF has continued for not less than the predetermined count CNTREF1, the operating ratio of the aircon 32 is low, and hence, since motive power consumed by the aircon 32 is small and influence on fuel economy is small, it is determined that the grille shutter 47 is to be closed. To indicate this, the aircon state flag F_SSA/C is set to "1" in a step 27, followed by terminating the present process.

On the other hand, if the answer to the question of the step 24 is NO, which means that the aircon operating ratio RA/CON is larger than the threshold value RREF, the first counter value CNTA/C1 is reset to 0 in a step 28, and it is determined in a step 29 whether or not the aircon operating ratio RA/CON is larger than the sum of the threshold value RREF and a hysteresis constant ΔR (=RREF+ΔR). If the answer to this question is NO, which means that RA/CON≤RREF+ΔR holds, the present process is immediately terminated.

On the other hand, if the answer to the question of the step 29 is YES, which means that RA/CON>RREF+ΔR holds, it is determined in a step 30 whether or not the first aircon operating timer value TM_A/CON1 which is reset in the step 17 in FIG. 5 is 0. If the answer to this question is NO, the present process is immediately terminated.

On the other hand, if the answer to the question of the step 30 is YES, in other words, if the aircon operating time ratio RA/CON exceeds the sum of the threshold value RREF and the hysteresis constant ΔR (=RREF+ΔR) and at the same time the operating state of the aircon 32 has continued for not less than the predetermined time period TONREF1, the operating rate of the aircon 32 is high, and hence, since motive power consumed by the aircon 32 is large and influence on fuel economy is large, it is determined that the grille shutter 47 is to be opened, so that in the above-mentioned step 31, the aircon state flag F_SSA/C is set to "0", followed by terminating the present process.

As described above, in the present process, when the aircon operating time ratio RA/CON exceeds the sum of the threshold value RREF and the hysteresis constant ΔR, it is determined that the grille shutter 47 is to be opened. Further, as described hereinabove, the threshold value RREF is set to a smaller value as the ambient air temperature TAM is higher, based on the map shown in FIG. 8. This is because as the ambient air temperature TAM is higher, the load on the aircon 32 becomes larger, which degrades fuel economy, and hence the grille shutter 47 is opened earlier to reduce the load on the aircon 32 to thereby improve fuel economy.

Figure 9:
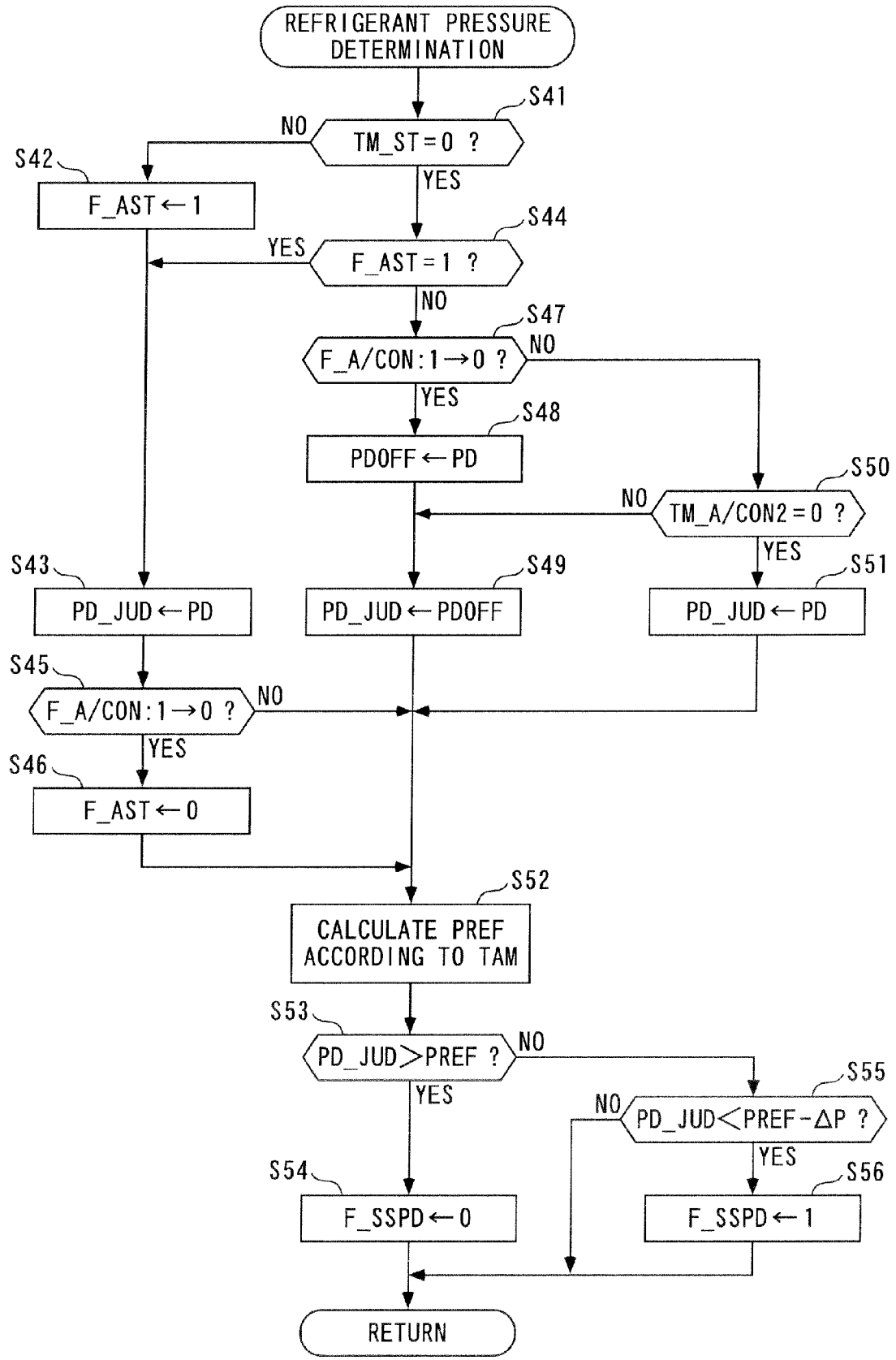
FIG. 9 A flowchart showing a refrigerant pressure determination process.

Referring again to FIG. 4, in a step 3 following the step 2, a refrigerant pressure determination process for the aircon 32 is executed. The refrigerant pressure determination process determines whether the grille shutter 47 is to be opened or closed, according to the refrigerant pressure PD detected by the refrigerant pressure sensor 23 of the aircon 32, mainly from the viewpoint of protecting the aircon 32, and FIG. 9 shows a subroutine therefor.

In the present process, first, it is determined in a step 41 whether or not the after-start timer value TM_ST is 0. If the answer to this question is NO, which means that the predetermined time period TMREF has not elapsed after starting the engine 3, an after-start flag F_AST is set to "1" in a step 42.

Next, in a step 43, determination-purpose refrigerant pressure PD_JUD for use in refrigerant pressure determination is set to the refrigerant pressure PD detected by the refrigerant pressure sensor 21 at the time. Next, it is determined in a step 45 whether or not the aircon operating flag F_A/CON has been changed from "1" to "0". If the answer to this question is YES, which means that the aircon 32 has been changed from the operating state to the stopped state, the after-start flag F_AST is set to "0" in a step 46, and the process proceeds to a step 52, referred to hereinafter. On the other hand, if the answer to the question of the step 45 is NO, the process directly proceeds to the step 52.

On the other hand, if the answer to the question of the step 41 is YES, which means that time not shorter than the predetermined time period TMREF has elapsed after starting the engine 3, it is determined in a step 44 whether or not the after-start flag F_AST is "1". If the answer to this question is YES, the process proceeds to the above-mentioned step 43, wherein the determination-purpose refrigerant pressure PD_JUD is set to the refrigerant pressure PD. As described above, the determination-purpose refrigerant pressure PD_JUD is set to the refrigerant pressure PD after the engine 3 is started and until the predetermined time period TMREF elapses, and further thereafter until the aircon 32 is changed from the operating state to the stopped state.

On the other hand, if the answer to the question of the step 44 is NO, which means that the after-start flag F_AST is "0", it is determined in a step 47 whether or not the aircon operating flag F_A/CON has been changed from "1" to "0". If the answer to this question is YES, which means that it is immediately after the aircon 32 is changed from the operating state to the stopped state, the refrigerant pressure PD, detected at the time, is stored as an aircon stoppage-time pressure PDOFF in a step 48, and this aircon stoppage-time pressure PDOFF is set as the determination-purpose refrigerant pressure PD_JUD in a step 49. Then, the process proceeds to the step 52.

On the other hand, if the answer to the question of the step 47 is NO, which means that it is not immediately after the aircon 32 is changed from the operating state to the stopped state, it is determined in a step 50 whether or not the second aircon operating timer value TM_A/CON2 reset in the step 18 in FIG. 5 is 0. If the answer to this question is NO, which means that the operating state of the aircon 32 has not continued for the predetermined time period TONREF2, the process proceeds to the above-mentioned step 49, wherein the determination-purpose refrigerant pressure PD_JUD is set to the aircon stoppage-time pressure PDOFF.

On the other hand, if the answer to the question of the step 50 is YES, which means that the operating state of the aircon 32 has continued for not less than the predetermined time period TONREF2, the determination-purpose refrigerant pressure PD_JUD is set to the refrigerant pressure PD in a step 51, and the process proceeds to the step 52.

In the step 52, which is executed if the answer to the question of the step 45 is NO or after execution of one of the steps 46, 49 and 51, a pressure threshold value PREF is calculated by searching a map shown in FIG. 10 according to the ambient air temperature TAM. In this map, the pressure threshold value PREF is set to a first predetermined PD1 when the ambient air temperature TAM is lower than a value TAM_B1, and is set to a larger value as the ambient air temperature TAM is higher when the ambient air temperature TAM is not lower than the value TAM_B1 and is lower than a value TAM_B2. Further, when the ambient air temperature TAM is higher than the value TAM_B2, the pressure threshold value PREF is set to a second predetermined value PD2 which is larger than the first predetermined value PD1.

Next, in a step 53, it is determined whether or not the determination-purpose refrigerant pressure PD_JUD which is set in the step 43, 49 or 51, is larger than the calculated pressure threshold value PREF. If the answer to this question is YES, since the refrigerant pressure PD is large, it is determined that the grille shutter 47 is to be opened to prevent the refrigerant pressure PD from becoming even larger to thereby protect the aircon 32, and to indicate this, a refrigerant pressure flag F_SSPD is set to "0" in a step 54, followed by terminating the present process.

On the other hand, if the answer to the question of the step 53 is NO, which means that PD_JUD≤PREF holds, it is determined in a step 55 whether or not the determination-purpose refrigerant pressure PD_JUD is lower than the difference between the pressure threshold value PREF and the predetermined hysteresis constant ΔP (=PREF−ΔP). If the answer to this question is NO, the present process is immediately terminated. On the other hand, if the answer to the question of the step 55 is YES, which means that the determination-purpose refrigerant pressure PD_JUD has become lower than PREF−ΔP, since the determination-purpose refrigerant pressure PD_JUD is low, the necessity for protecting the aircon 32 is regarded to be small, and it is determined that the grille shutter 47 is to be closed. To indicate this, the refrigerant pressure flag F_SSPD is set to "1" in a step 56, followed by terminating the present process.

Figure 11:
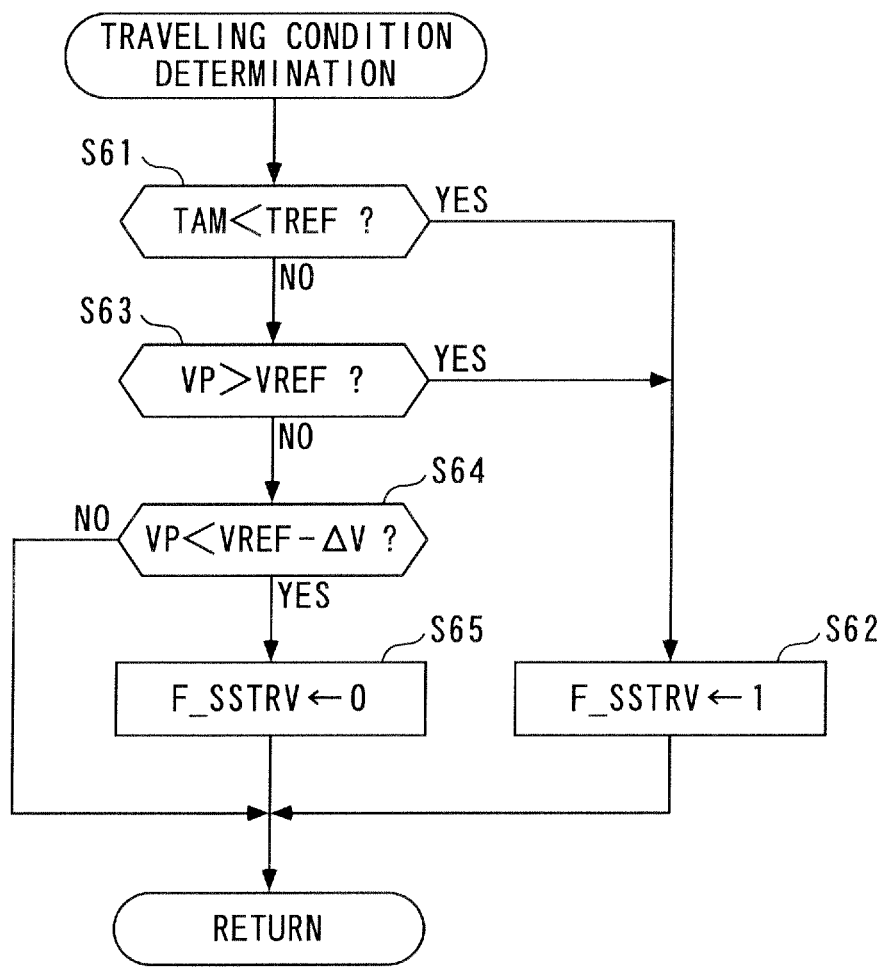
FIG. 11 A flowchart showing a traveling condition determination process.

Referring again to FIG. 4, in a step 4 following the step 3, a traveling state determination process is executed. The traveling condition determination process determines whether the grille shutter 47 is to be opened or closed, according to the traveling state of the vehicle V, from the viewpoint of improvement of fuel economy, and FIG. 11 shows a subroutine therefor.

In the present process, first, it is determined in a step 61 whether or not the ambient air temperature TAM is lower than a predetermined temperature TREF (e.g. 0° C.). If the answer to this question is YES, since the ambient air temperature TAM is low, the necessity for using the aircon 32 is regarded to be small, and it is determined that the grille shutter 47 is to be closed to obtain an air resistance reduction effect by closing the grille shutter 47. To indicate this, a traveling condition flag F_SSTRV is set to "1" in a step 62, followed by terminating the present process.

On the other hand, if the answer to the question of the step 61 is NO, which means that TAM≥TREF holds, it is determined in a step 63 whether or not the vehicle speed VP is higher than a predetermined speed VREF (e.g. 30 km/h). If the answer to this question is YES, since the vehicle speed VP is high, a refrigerant cooling effect by traveling wind is estimated to be large. Therefore, it is determined that the grille shutter 47 is to be closed, and the step 62 is executed to set the traveling condition flag F_SSTRV to "1".

On the other hand, if the answer to the question of the step 63 is NO, which means that VP≤VREF holds, it is determined in a step 64 whether or not the vehicle speed VP is lower than the difference between the predetermined speed VREF and the predetermined hysteresis constant ΔV (=VREF−ΔV). If the answer to this question is NO, the present process is immediately terminated. On the other hand, if the answer to the question of the step 64 is YES, which means that VP<VREF−ΔV holds, since the vehicle speed VP is low, the air resistance reduction effect by closing the grille shutter 47 is small and the refrigerant cooling effect by traveling wind is low, which is likely to increase the load on the aircon 32. Therefore, it is determined that the grille shutter 47 is to be opened, and to indicate this, the traveling condition flag F_SSTRV is set to "0" in a step 65, followed by terminating the present process.

Figure 12:
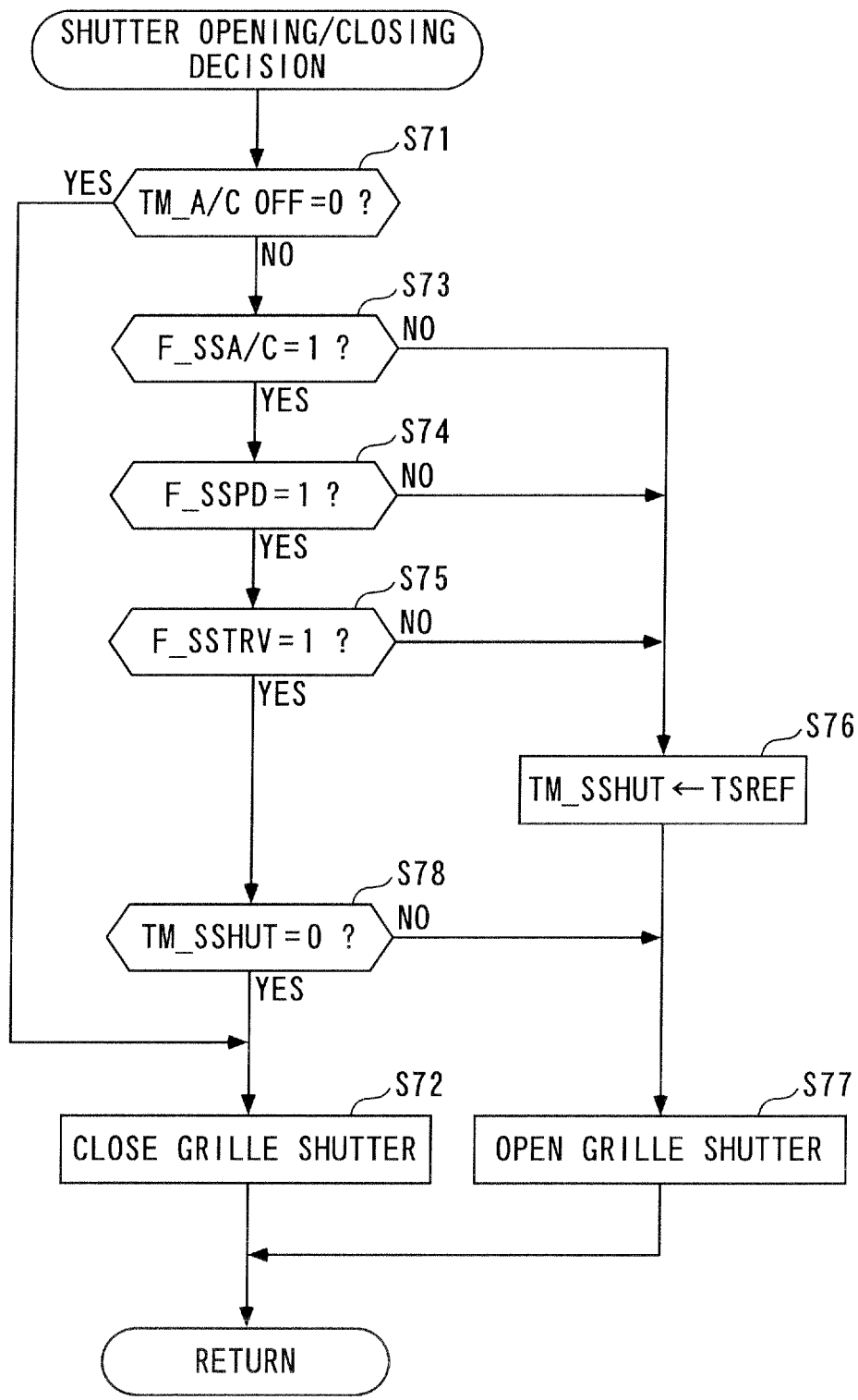
FIG. 12 A flowchart showing an opening/closing decision process for the grille shutter according to the first embodiment.

Referring again to FIG. 4, in a step 5 following the step 4, a shutter opening/closing decision process is executed, followed by terminating the process in FIG. 4. The shutter opening/closing decision process finally decides, based on the results of determination by the processes in the steps 1 to 4, whether to open or close the grille shutter 47, and FIG. 12 shows a subroutine therefor.

In the present process, first, it is determined in a step 71 whether or not the aircon stoppage timer value TM_A/COFF is 0. If the answer to this question is YES, which means that the predetermined time period TMREF has not elapsed after starting the engine 3, or the stopped state of the aircon 32 has continued for not less than the predetermined time period TOFFREF, since the driver does not intend to use the aircon 32, it is decided that the grille shutter 47 is to be closed, and the grille shutter 47 is closed by driving the motor 31 in a step 72, followed by terminating the present process.

As described above, when the stopped state of the aircon 32 continues for not less than the predetermined time period TOFFREF, the grille shutter 47 is closed. Further, as described hereinabove, the predetermined time period TOFFREF is basically set to a smaller value as the ambient air temperature TAM is higher, according to the map shown in FIG. 6. This is because as the ambient air temperature TAM is higher, the operation frequency of the aircon 32 is naturally higher and the duration of the stopped state thereof tends to be shorter, so that the determination that the driver does not have an intention to use the aircon 32 is executed earlier, whereby the grille shutter 47 is closed earlier in order to obtain the air resistance reduction effect.

On the other hand, if the answer to the question of the step 71 is NO, which means that the aircon stoppage timer value TM_A/COFF is not 0, it is determined in respective steps 73 to 75 whether or not there are satisfied the following conditions (a) to (c):

(a) the aircon state flag F_SSA/C is "1"
(b) the refrigerant pressure flag F_SSPD is "1"
(c) the traveling condition flag F_SSTRV is "1"

If any of the answers to these questions of the steps 73 to 75 is NO, which means that any of the conditions (a) to (c) is not satisfied, it is decided that the grille shutter 47 is to be opened, and a closing delay timer value TM_SSHUT, referred to hereinafter, is reset to a predetermined time period TSREF (e.g. 30 sec) in a step 76, and the grille shutter 47 is opened by driving the motor 31 in a step 77, followed by terminating the present process.

On the other hand, if all the answers to the steps 73 to 75 are YES, it is decided that the grille shutter 47 is to be closed, and it is determined in a step 78 whether or not the closing delay timer value TM_SSHUT is 0. If the answer to this question is NO, which means that the predetermined time period TSREF has not elapsed after all the above conditions (a) to (c) are satisfied, the above-mentioned step 77 is executed to hold the grille shutter 47 in the open state.

On the other hand, if the answer to the question of the step 78 is YES, which means that time not shorter than the predetermined time period TSREF has elapsed after all the above conditions (a) to (c) are satisfied, the above-mentioned step 72 is executed to close the grille shutter 47.

As described above, according to the present embodiment, when the aircon operating time ratio RA/CON is larger than the sum of the threshold value RREF calculated according to the ambient air temperature TAM and the hysteresis constant ΔR (YES to the step 29 in FIG. 7), the grille shutter 47 is opened, which promotes the cooling of the refrigerant in the condenser 11 and reduces the load on the aircon 32, whereby the motive power consumed thereby can be reduced. Therefore, the grille shutter 47 can be appropriately opened and closed depending on the ambient air temperature TAM and the operating rate of the aircon 32 while ensuring the operation of the aircon 32, and thereby sufficiently improve fuel economy.

Further, when the stopped state of the aircon 32 has continued for not less than the predetermined time period TOFFREF (YES to the step 71 in FIG. 12), the grille shutter 47 is closed. Therefore, the reduction of air resistance by the closing thereof makes it possible to further improve fuel economy.

Further, when the refrigerant pressure PD of the aircon 32 is larger than the pressure threshold value PREF (YES to the step 53 in FIG. 9), the grille shutter 47 is opened, which promotes the cooling of the refrigerant of the aircon 32 and reduces the load on the aircon 32, whereby it is possible to avoid the refrigerant pressure PD from becoming even higher to be too high, and hence the aircon 32 can be effectively protected. Further, in normal times, the fixed aircon stoppage-time pressure PDOFF obtained when the aircon 32 is stopped is used as the determination-purpose refrigerant pressure PD_JUD for refrigerant pressure determination (step 49 in FIG. 9), and hence the opening/closing control of the grille shutter 47 can be appropriately executed without hunting.

Further, when the operating state of the aircon 32 has continued for not less than the predetermined time period TONREF2 (YES to the step 50 in FIG. 9), the refrigerant pressure PD is used as the determination-purpose refrigerant pressure PD_JUD, and hence the opening/closing of the grille shutter 47 can be appropriately controlled in a fine-grained manner depending on the actual refrigerant pressure PD which fluctuates during operation of the aircon 32, and the aircon 32 can be more effectively protected.

Further, when the ambient air temperature TAM is lower than the predetermined temperature TREF (YES to the step 61 in FIG. 11), the grille shutter 47 is closed. Therefore, when the ambient air temperature is low as in winter season, during which the aircon 32 is not used or the necessity for using the same is low, the grille shutter 47 is closed, whereby it is possible to improve fuel economy and promote warming up of the engine 3.

Further, when the vehicle speed VP is lower than the difference between the predetermined speed VREF and the hysteresis constant ΔV (YES to the step 64 in FIG. 11), the grille shutter 47 is opened, and the cooling of refrigerant thereby makes it possible to appropriately reduce the load on the aircon 32, which is likely to become larger when the vehicle V is at stop.

Further, when the grille shutter 47 is switched from the open state to the closed state, the switching is inhibited for the predetermined time period TSREF (NO to the step 78 in FIG. 12), whereby it is possible to appropriately prevent hunting from being caused for opening/closing by the switching.

Next, an opening/closing control process for the grill shutter 47 according to a second embodiment of the present invention will be described with reference to the FIGS. 13 to 17. In the first embodiment described above, the compressor 13 is of a fixed capacity type, and the opening/closing control device 1 decides whether to open or close the grille shutter 47 according to the aircon operating time ratio RA/CON of the aircon 32. In contrast, the present embodiment uses a compressor 113 of a variable capacity type, e.g. a swash plate type, and an opening/closing control device 101 decides whether to open or close the grille shutter 47 according to the capacity of the compressor 113.

Figure 13:
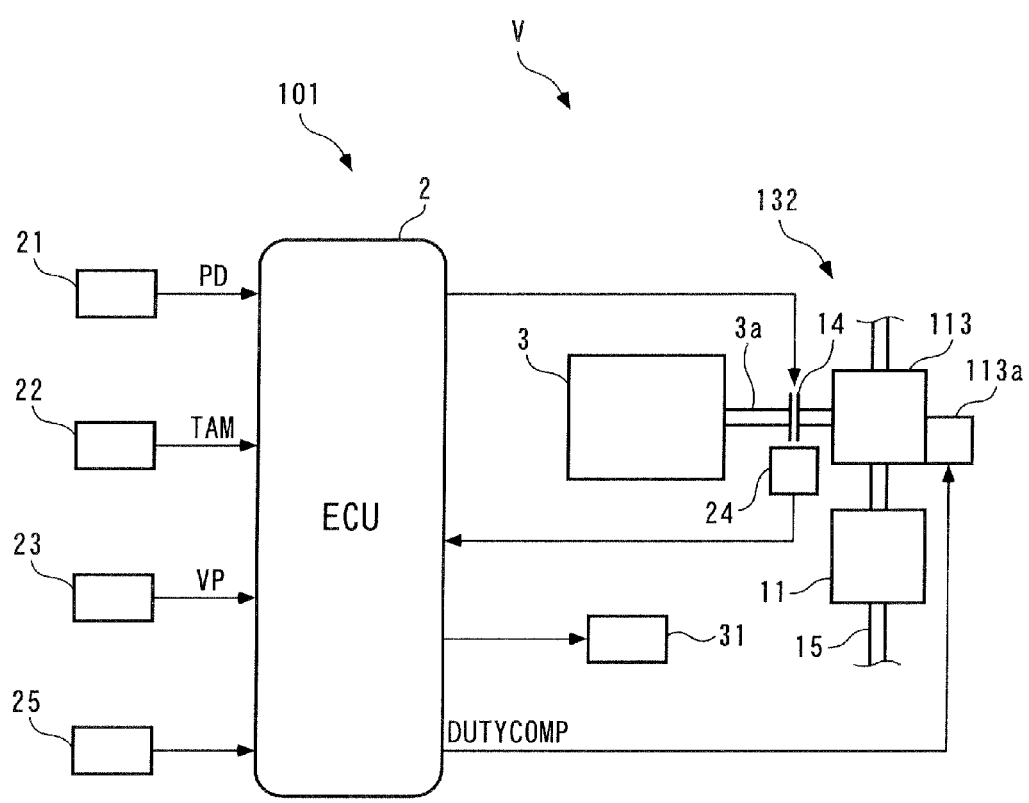
FIG. 13 A block diagram showing an opening/closing control device for a grille shutter according to a second embodiment.

As shown in FIG. 13, the compressor 113 includes an electromagnetic control valve 113*a* for varying the capacity thereof. The capacity of the compressor 113 is varied by a duty ratio DUTYCOMP of drive current which is supplied from the ECU 2 to the electromagnetic control valve 113*a*, and becomes larger as the duty ratio DUTYCOMP is higher.

Figure 14:
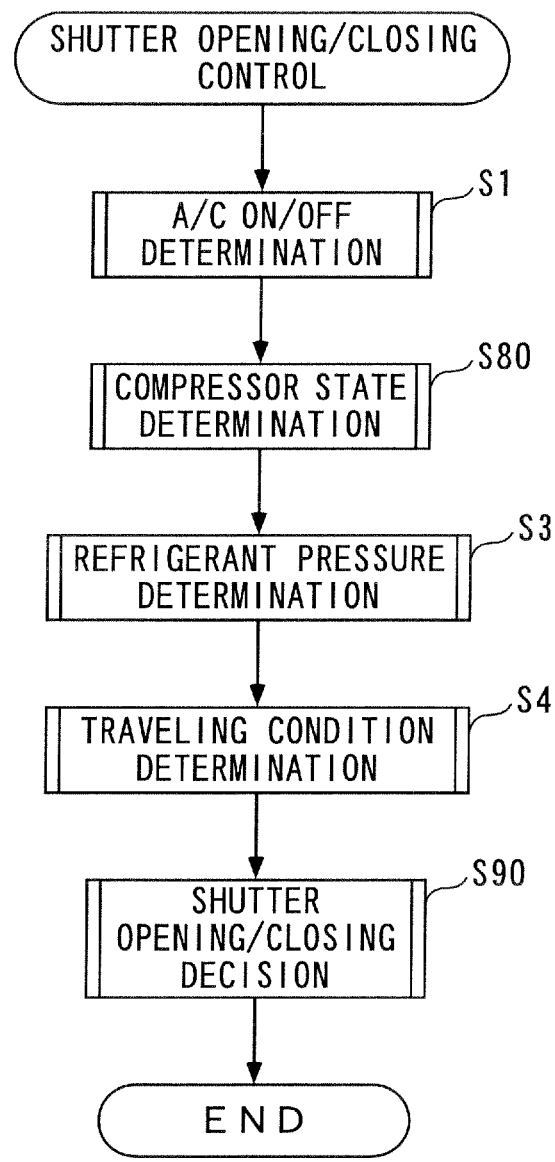
FIG. 14 A flowchart showing an opening/closing control process for the grille shutter according to the second embodiment.
Figure 15:
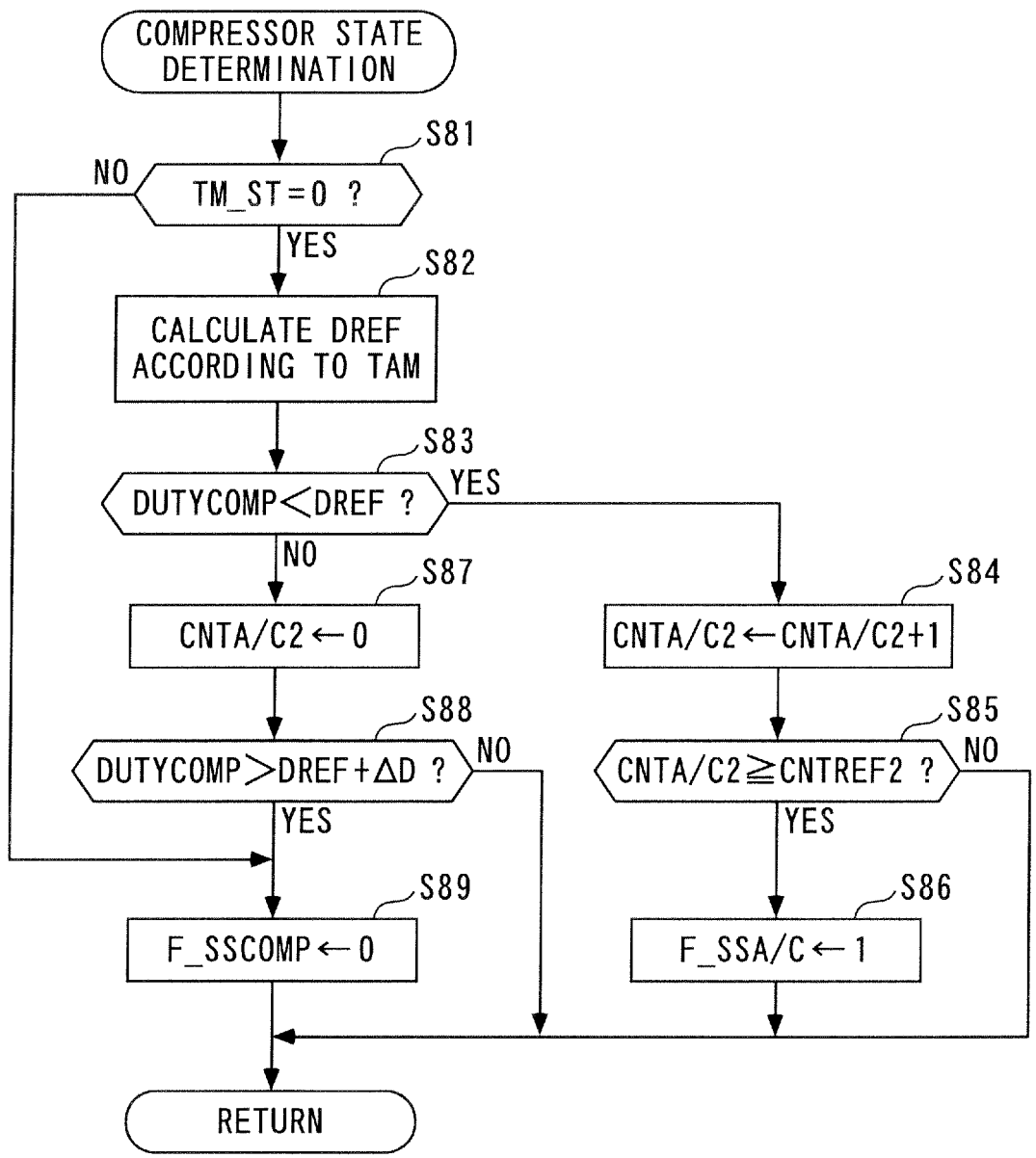
FIG. 15 A flowchart showing a compressor state determination process.

FIG. 14 shows a main routine of the opening/closing control process for the grille shutter 47 according to the second embodiment. Note that process steps which are identical in details of processing to corresponding ones in the above-described first embodiment are denoted by the same step numbers. In the present process, first, in the step 1, the above-described aircon operation/stoppage determination process is executed. Next, in a step 80, a compressor state determination process is executed. The compressor state determination process determines whether the grille shutter 47 is to be closed or opened, according to the capacity (hereinafter referred to as "operating capacity") of the compressor 113 set thereto at the time, from the viewpoint of improvement of fuel economy, and FIG. 15 shows a subroutine therefor.

In the present process, first, in a step 81, it is determined whether or not the after-start timer value TM_ST is 0. If the answer to this question is NO, which means that the predetermined time period TMREF has not elapsed after starting the engine 3, it is determined that the grille shutter 47 is to be opened, and to indicate this, a compressor state flag F_SS-COMP is set to "0" in a step 89, followed by terminating the present process.

Figure 16:
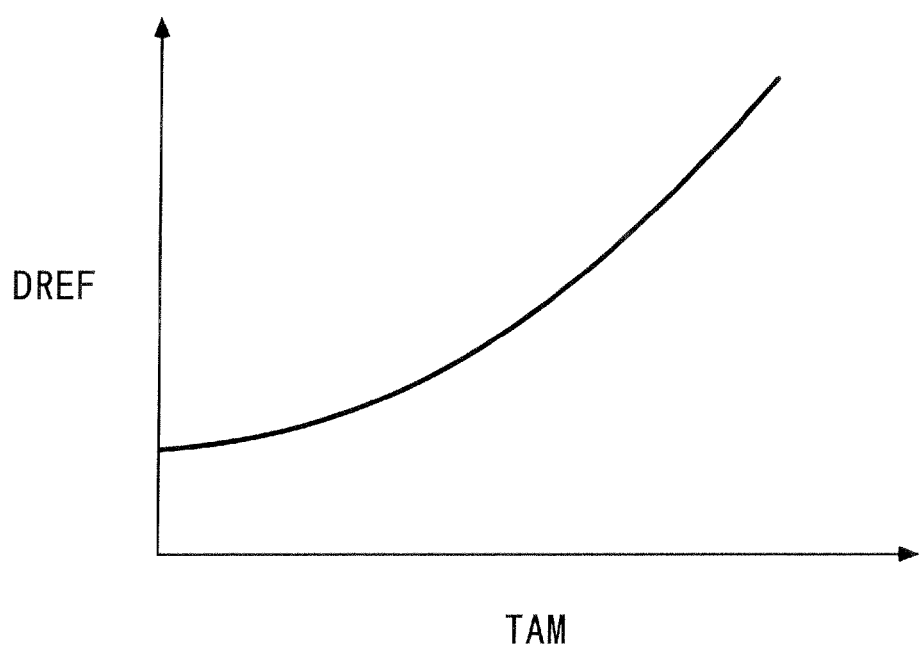
FIG. 16 A map for calculating a threshold value of a duty ratio of drive current.

On the other hand, if the answer to the question of the step 81 is YES, which means that time not shorter than the predetermined time period TMREF has elapsed after starting the engine 3, a threshold value DREF is calculated by searching a map shown in FIG. 16 according to the ambient air temperature TAM in a step 82. In the map, the threshold value DREF is set to a larger value as the ambient air temperature TAM is higher.

Next, in a step 83, it is determined whether or not the duty ratio DUTYCOMP of drive current to the electromagnetic control valve 113*a* of the compressor 113 is smaller than the calculated threshold value DREF. If the answer to this question is YES, a second counter value CETA/C2 which counts the number of times of duration of this state is incremented in a step 84, and it is determined in a step 85 whether or not the second counter value CNTA/C2 is not smaller than a predetermined number of times CNTREF2 (e.g. 4). If the answer to this question is NO, the present process is immediately terminated.

On the other hand, if the answer to the question of the step 85 is YES, in other words, if the state in which the duty ratio DUTYCOMP is below the threshold value DREF has continued for not smaller than the predetermined number of times CNTREF2, since the operating capacity of the compressor 113 is small, it is judged that motive power consumed by an aircon 132 is small and influence on fuel economy is small. Therefore, it is determined that the grille shutter 47 is to be closed, and to indicate this, the compressor state flag F_SSCOMP is set to "1" in a step 86, followed by terminating the present process.

On the other hand, if the answer to the question of the step 83 is NO, which means that the duty ratio DUTYCOMP is not smaller than the threshold value DREF, the second counter value CNTA/C2 is reset to "0" in a step 87, and it is determined in a step 88 whether or not the duty ratio DUTYCOMP is larger than the sum of the threshold value DREF and a hysteresis constant $\Delta D$ (=DREF+$\Delta D$). If the answer to this question is NO, which means that DUTYCOMP≤DREF+$\Delta D$ holds, the present process is immediately terminated.

On the other hand, if the answer to the question of the step 88 is YES, which means that DUTYCOMP>DREF+$\Delta D$ holds, the operating capacity of the compressor 113 is large, and hence it is judged that motive power consumed by the aircon 132 is large and influence on fuel economy is large. Therefore, it is determined that the grille shutter 47 is to be opened, so that the compressor state flag F_SSCOMP is set to "0" in the above-mentioned step 89, followed by terminating the present process.

As described above, in the present process, when the duty ratio DUTYCOMP exceeds the sum of the threshold value DREF and the hysteresis constant $\Delta D$, it is determined that the grille shutter 47 is to be opened. Further, as described hereinabove, the threshold value DREF is set to a larger value as the ambient air temperature TAM is higher, based on the map shown in FIG. 16. This is because as the ambient air temperature TAM is higher, the load on the aircon 132 becomes higher, and the operating capacity of the compressor 113 naturally becomes larger in accordance therewith.

Figure 17:
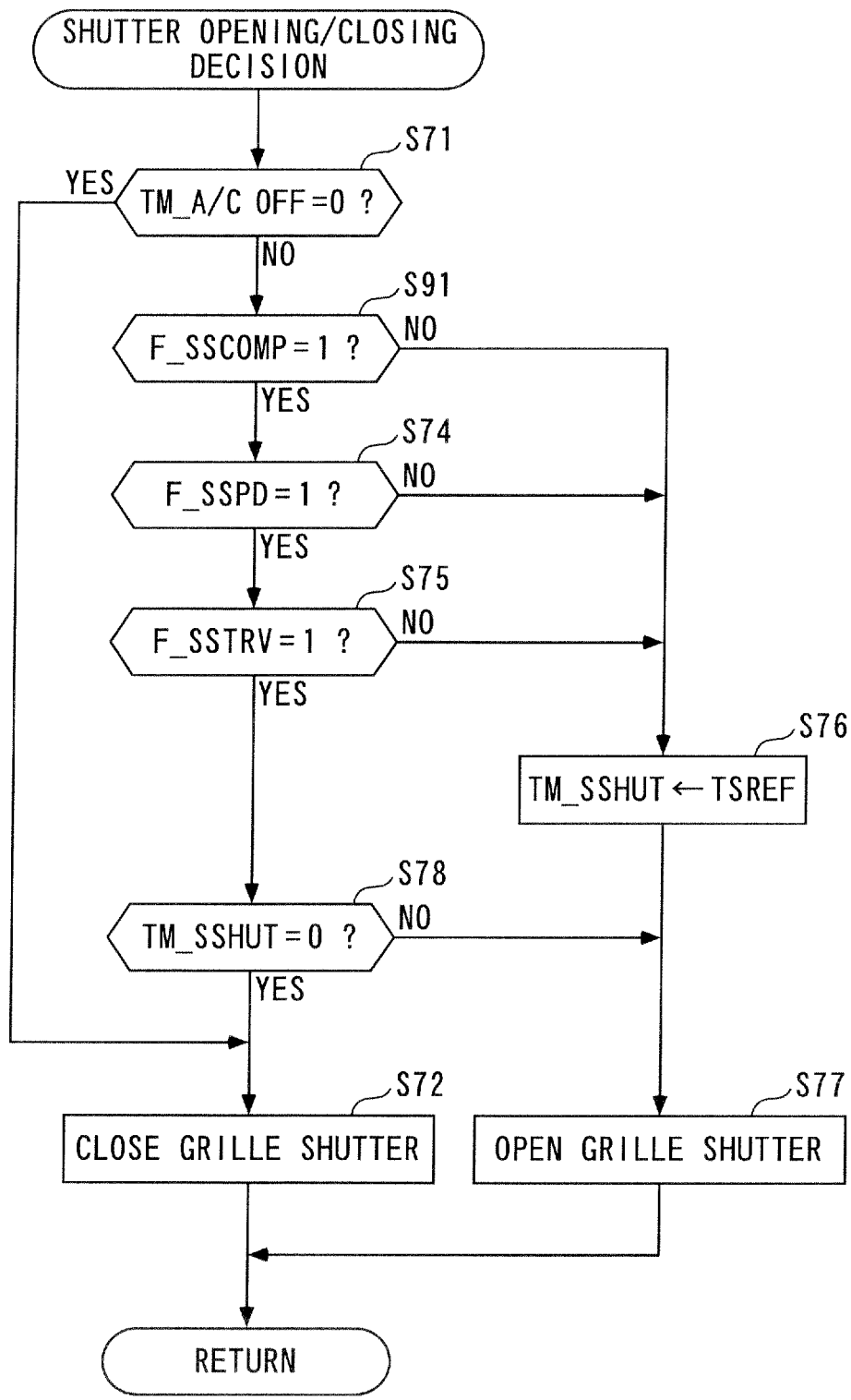
FIG. 17 A flowchart showing a opening/closing decision process for the grille shutter according to the second embodiment.

Referring again to FIG. 14, in the steps 3 and 4 following the step 80, the refrigerant pressure determination process for the aircon 132 and the traveling state determination process, described hereinabove, are executed, respectively. Next, in a step 90, a shutter opening/closing decision process is executed, and then the process shown in FIG. 14 is terminated. FIG. 17 shows a subroutine for the shutter opening/closing decision process. In this process, a step 91, described hereinafter, is executed in place of the step 73 of the shutter opening/closing decision process (in FIG. 12) according to the first embodiment described above.

In the present process, first, in the step 71, it is determined whether or not the aircon stoppage timer value TM_A/COFF is 0. If the answer to this question is YES, the grille shutter 47 is closed by driving the motor 31 in the step 72, followed by terminating the present process.

On the other hand, if the answer to the question of the step 71 is NO, which means that the aircon stoppage timer value TM_A/COFF is not 0, in a step 91 and the steps 74 and 75, it is determined whether or not there are satisfied the following conditions (a) to (c), respectively:

(a) the compressor state flag F_SSCOMP is "1"
(b) the refrigerant pressure flag F_SSPD is "1"
(c) the traveling condition flag F_SSTRV is "1"

If any of the answers to these questions of the steps 91, 74 and 75 is NO, which means that any of the conditions (a) to (c) is not satisfied, it is decided that the grille shutter 47 is to be opened, and the closing delay timer value TM_SSHUT is reset to the predetermined time period TSREF in the step 76, and the grille shutter 47 is opened by driving the motor 31 in the step 77, followed by terminating the present process.

On the other hand, all the answers to the steps 91, 74 and 75 are YES, it is decided that the grille shutter 47 is to be closed, and it is determined in the step 78 whether or not the closing delay timer value TM_SSHUT is 0. If the answer to this question is NO, which means that the predetermined time period TSREF has not elapsed after all the above conditions (a) to (c) are satisfied, the above-mentioned step 77 is executed to hold the grille shutter 47 in the open state.

On the other hand, if the answer to the question of the step 78 is YES, which means that time not shorter than the predetermined time period TSREF has elapsed after all the above conditions (a) to (c) are satisfied, the above-mentioned step 72 is executed to close the grille shutter 47.

As described above, according to the present embodiment, when the duty ratio DUTYCOMP for varying the capacity of the compressor 113 is larger than the sum of the threshold value DREF calculated according to the ambient air temperature TAM and the hysteresis constant $\Delta D$ (YES to the step 88 in FIG. 15), the grille shutter 47 is opened, which promotes the cooling of the refrigerant in the condenser 11 and reduces the load on the aircon 132, whereby the motive power consumed thereby can be reduced. Therefore, it is possible to appropriately open or close the grille shutter 47, depending on the ambient air temperature TAM and the operating capacity of the compressor 113, while ensuring the operation of the aircon 132, whereby fuel economy can be sufficiently improved.

Note that, the present invention is by no means limited to the above-described embodiments, but can be practiced in various forms. For example, although as the load on the aircon, there are used the aircon operating time ratio RA/CON in the first embodiment, and the duty ratio DUTYCOMP of drive current in the second embodiment, any other suitable parameter may be used in addition to or in place of these. For example, an amount of the refrigerant fed from the compressor 13 or 113 may be detected and used.

Further, in the first embodiment, although as the aircon operating time ratio RA/CON, the aircon operating time ratio RA/CON, which is a ratio of the aircon operating time T_A/CON to a total operating time of the aircon 32, is used, this is not limitative, but for example, a ratio of the aircon operating time T_A/CON to the aircon stoppage time T_A/COFF (=(T_A/CON)/(T_A/COFF)) may be used.

Further, in the second embodiment, although the duty ratio DUTYCOMP of drive current to the electromagnetic control valve 113*a* is used as an operating capacity parameter which indicates the operating capacity of the compressor 113, this is not limitative, but, for example, an angle of a swash plate which defines the capacity of the compressor 113 may be detected and used.

Further, in the first embodiment, although hystereses are set to the threshold value RREF with which the aircon operating time ratio RA/CON is compared, the pressure threshold value PREF with which the determination-purpose refrigerant pressure PD_JUD is compared, and the predetermined speed VREF with which the vehicle speed VP is compared, respectively, these hystereses may be omitted.

Similarly, in the second embodiment, although hystereses are set to the threshold value DREF with which the duty ratio DUTYCOMP is compared, the pressure threshold value PREF with which the determination-purpose refrigerant pressure PD_JUD is compared, and the predetermined speed VREF with which the vehicle speed VP is compared, these hysteresis may be omitted.

Further, although the embodiments apply the present invention to a vehicle that mounts a gasoline engine, by way of example, this is not limitative, but the present invention may be applied to any suitable vehicle that mounts one of various engines other than the gasoline engine, such as a diesel engine, and may be applied to a hybrid vehicle that uses an engine and an electric motor in combination, as well as to an electric motor vehicle which uses only an electric motor. It is to be further understood that various changes and modifications may be made without departing from the spirit and scope of the present invention.

INDUSTRIAL APPLICABILITY

As described heretofore, the opening/closing control device according to the present invention is useful for appropriately opening and closing a grille shutter depending on an external environment of a vehicle and an operating state of an aircon while ensuring the operation of the aircon.

REFERENCE SIGNS LIST 1 opening/closing control device
2 ECU (load acquisition means, operating time ratio-calculating means, operation capacity parameter acquisition means, threshold value-setting means, opening/closing control means, determination-purpose refrigerant pressure-setting means, switching inhibiting means)
21 refrigerant pressure sensor (cooling pressure-detecting means) ambient
22 ambient air temperature sensor (ambient air temperature-detecting means)
23 vehicle speed sensor (vehicle speed-detecting means)
24 clutch switch (operation/stoppage-detecting means)
31 motor (opening/closing control means)
32 air conditioner (aircon)
47 grille shutter
101 opening/closing control device
113 compressor
132 air conditioner (aircon)
V vehicle
TAM ambient air temperature (temperature of ambient air)
RA/CON aircon operating time ratio (load of aircon, operating time ratio of aircon)
DUTYCOMP duty ratio of drive current to electromagnetic control valve (load of aircon, operating capacity parameter)
RREF threshold value
DREF threshold value
PDOFF aircon stoppage-time pressure
TREF predetermined temperature
TOFFREF predetermined time period
TONREF2 predetermined time period
TSREF predetermined time period
PD refrigerant pressure (pressure of refrigerant)
PD_JUD determination-purpose refrigerant pressure (refrigerant for use in determination)
VP vehicle speed
VREF-ΔV difference between predetermined speed and hysteresis constant (predetermined speed)

The invention claimed is:

1. An opening/closing control device for a grille shutter, for controlling opening/closing of a grille shutter that is openably and closably provided at a front part of a vehicle, and when opened, introduces ambient air into the vehicle for cooling refrigerant of an aircon of the vehicle, comprising:
   a load acquisition processor configured to acquire a load on the aircon;
   an ambient air temperature sensor configured to detect a temperature of ambient air;
   a threshold value-setting processor configured to set a threshold value according to the detected temperature of ambient air; and
   an opening/closing controller configured to control a motor to open the grille shutter when the acquired load is larger than the set threshold value,
   wherein said opening/closing control processor is configured to control the motor to close the grille shutter when a stopped state of the aircon has continued for not less than a predetermined time period.

2. The opening/closing control device as claimed in claim 1, further comprising an operation/stoppage state-detecting processor configured to detect whether the aircon is in an operating state or in the stopped state, and
   wherein said load acquisition processor includes an operating time ratio-calculating processor configured to calculate an operation time ratio of the aircon, based on the detected operating/stopped state of the aircon, as the load on the aircon.

3. The opening/closing control device as claimed in claim 2, further comprising:
   a cooling pressure-detecting processor configured to detect a pressure of the refrigerant of the aircon, and
   a determination-purpose refrigerant pressure-setting processor configured to set the pressure of the refrigerant, detected by said cooling pressure-detecting processor, as refrigerant pressure for determination, when the aircon has been changed from the operating state to the stopped state, and
   wherein said opening/closing controller is configured to control the motor to open the grille shutter when the set refrigerant pressure for determination is larger than a predetermined pressure threshold value.

4. The opening/closing control device as claimed in claim 3,
   wherein said determination-purpose refrigerant pressure-setting processor is configured to set the refrigerant pressure, detected by said cooling pressure-detecting processor, as the refrigerant pressure for determination, when the operating state of the aircon has continued for not less than the predetermined time period.

5. The opening/closing control device as claimed in claim 3,
   wherein said opening/closing controller is configured to control the motor to close the grille shutter when the detected temperature of ambient air is lower than a predetermined temperature.

6. The opening/closing control device as claimed in claim 3, further comprising a vehicle speed-detecting processor configured to detect a speed of the vehicle, and
   wherein said opening/closing controller is configured to control the motor to open the grille shutter when the detected speed of the vehicle is lower than a predetermined speed.

7. The opening/closing control device as claimed in claim 2,
wherein said opening/closing controller is configured to control the motor to close the grille shutter when the detected temperature of ambient air is lower than a predetermined temperature.

8. The opening/closing control device as claimed in claim 2, further comprising a vehicle speed-detecting processor configured to detect a speed of the vehicle, and
wherein said opening/closing controller is configured to control the motor to open the grille shutter when the detected speed of the vehicle is lower than a predetermined speed.

9. The opening/closing control device as claimed in claim 2, further comprising:
a switching inhibiting processor configured to inhibit, when switching the grille shutter from an open state to a closed state by said opening/closing controller, the switching for a predetermined time period.

10. The opening/closing control device as claimed in claim 1,
wherein a compressor that compresses the refrigerant of the aircon is formed by a variable capacity compressor that can vary a capacity thereof, and
wherein said load acquisition processor includes an operating capacity parameter acquisition processor configured to acquire an operating capacity parameter that indicates an operating capacity of the compressor as the load on the aircon.

11. The opening/closing control device as claimed in claim 10, further comprising:
a cooling pressure-detecting processor configured to detect a pressure of the refrigerant of the aircon, and
a determination-purpose refrigerant pressure-setting processor configured to set the pressure of the refrigerant, detected by said cooling pressure-detecting processor, as refrigerant pressure for determination, when the aircon has been changed from the operating state to the stopped state, and
wherein said opening/closing controller is configured to control the motor to open the grille shutter when the set refrigerant pressure for determination is larger than a predetermined pressure threshold value.

12. The opening/closing control device as claimed in claim 11,
wherein said determination-purpose refrigerant pressure-setting processor is configured to set the refrigerant pressure, detected by said cooling pressure-detecting processor, as the refrigerant pressure for determination, when the operating state of the aircon has continued for not less than the predetermined time period.

13. The opening/closing control device as claimed in claim 10,
wherein said opening/closing controller is configured to control the motor to close the grille shutter when the detected temperature of ambient air is lower than a predetermined temperature.

14. The opening/closing control device as claimed in claim 10, further comprising a vehicle speed-detecting processor configured to detect a speed of the vehicle, and
wherein said opening/closing controller is configured to control the motor to open the grille shutter when the detected speed of the vehicle is lower than a predetermined speed.

15. The opening/closing control device as claimed in claim 10, further comprising:
a switching inhibiting processor configured to inhibit, when switching the grille shutter from an open state to a closed state by said opening/closing controller, the switching for a predetermined time period.

16. The opening/closing control device as claimed in claim 1,
wherein said opening/closing control controller is configured to control the motor to close the grille shutter when the detected temperature of ambient air is lower than a predetermined temperature.

17. The opening/closing control device as claimed in claim 1, further comprising a vehicle speed-detecting processor configured to detect a speed of the vehicle, and
wherein said opening/closing controller is configured to control the motor to open the grille shutter when the detected speed of the vehicle is lower than a predetermined speed.

18. The opening/closing control device as claimed in claim 1, further comprising:
a switching inhibiting processor configured to inhibit, when switching the grille shutter from an open state to a closed state by said opening/closing controller, the switching for a predetermined time period.

* * * * *